Feb. 1, 1955

G. R. STIBITZ 2,701,095

ELECTRONIC COMPUTER FOR DIVISION

Filed Feb. 12, 1949

(FOR USE WITH CONTROL UNIT OF FIG. 2)

INVENTOR.
George R. Stibitz
BY
Carlson, Pitzner, Hubbard & Wolfe
ATTORNEYS

Feb. 1, 1955

G. R. STIBITZ 2,701,095

ELECTRONIC COMPUTER FOR DIVISION

Filed Feb. 12, 1949

INVENTOR.
George R. Stibitz
BY
Carlson, Pitzner, Hubbard & Wolfe
ATTORNEYS

Feb. 1, 1955  G. R. STIBITZ  2,701,095
ELECTRONIC COMPUTER FOR DIVISION
Filed Feb. 12, 1949  14 Sheets-Sheet 3

INVENTOR.
George R. Stibitz
BY
Carlson, Pitzner, Hubbard & Wolfe
ATTORNEYS

Feb. 1, 1955          G. R. STIBITZ          2,701,095
ELECTRONIC COMPUTER FOR DIVISION
Filed Feb. 12, 1949                          14 Sheets-Sheet 4
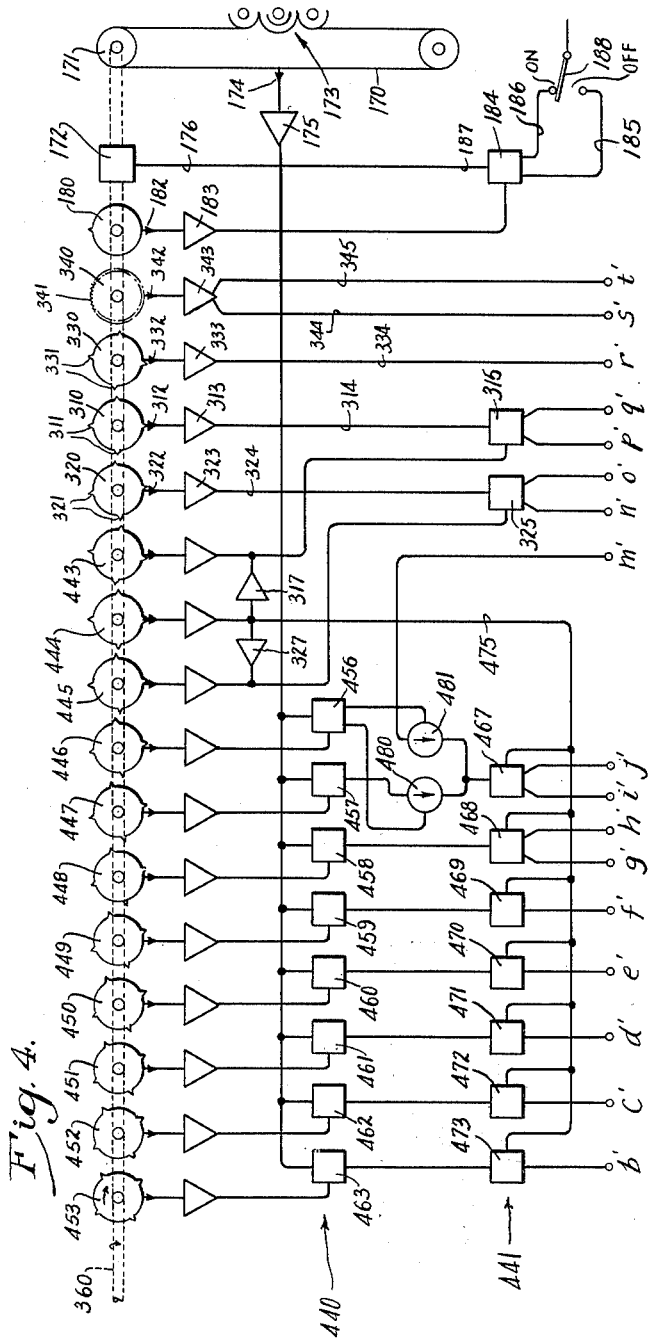
INVENTOR.
George R. Stibitz
BY
Carlson, Pitzner, Hubbard & Wolfe
ATTORNEYS

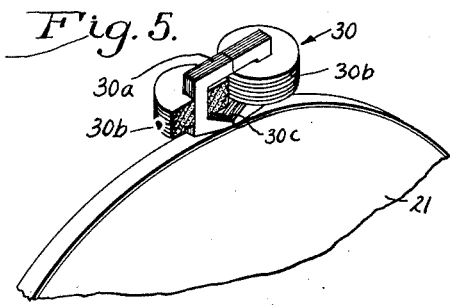
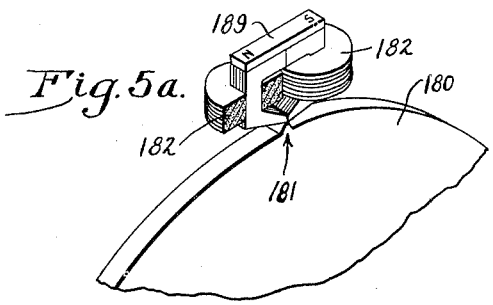
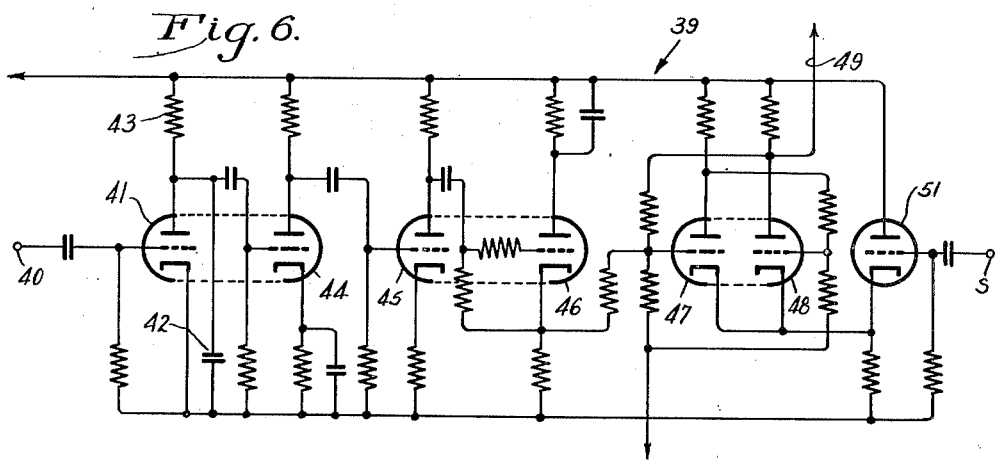
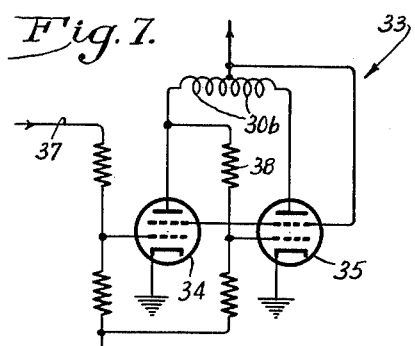
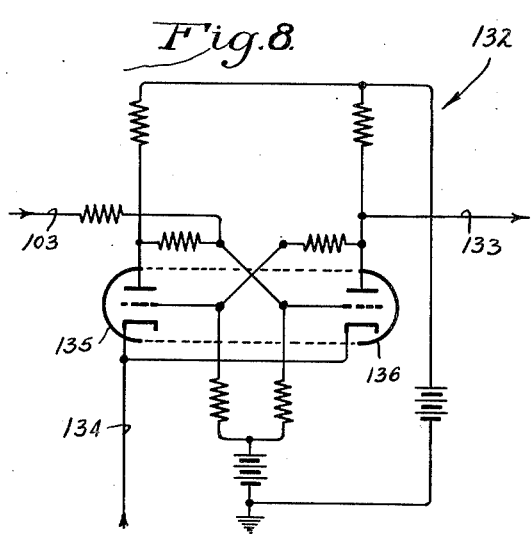
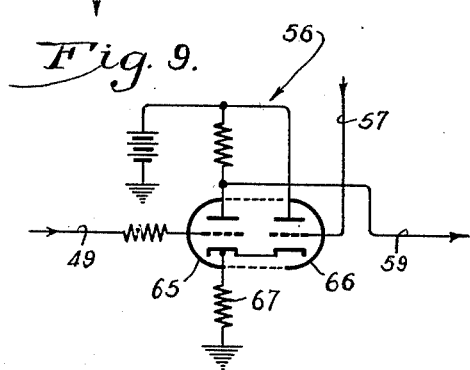
INVENTOR.
George R. Stibitz
BY
Carlson, Pitzner, Hubbard & Wolfe
ATTORNEYS Feb. 1, 1955  G. R. STIBITZ  2,701,095
ELECTRONIC COMPUTER FOR DIVISION
Filed Feb. 12, 1949  14 Sheets-Sheet 7
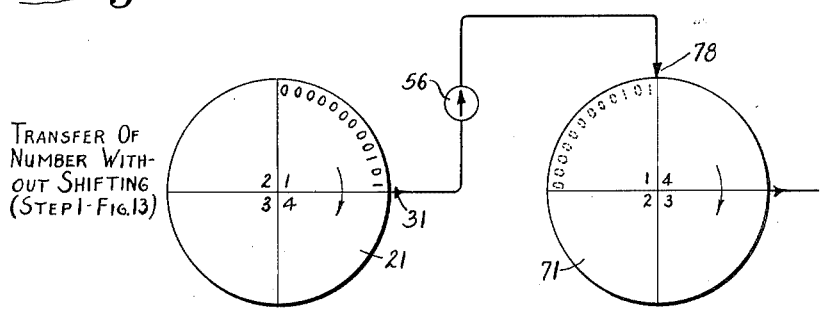
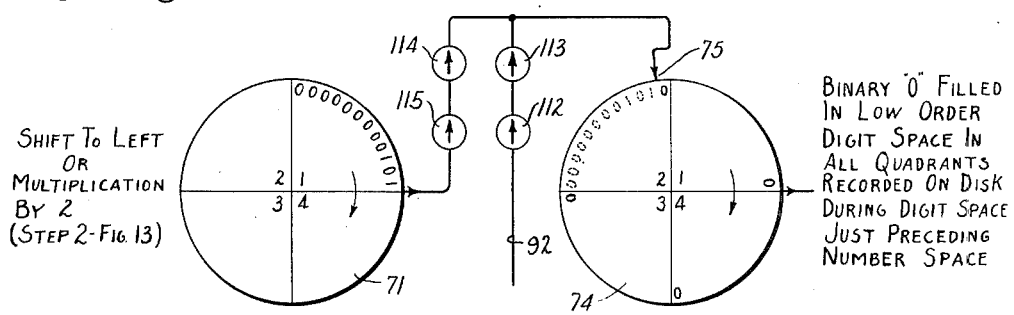
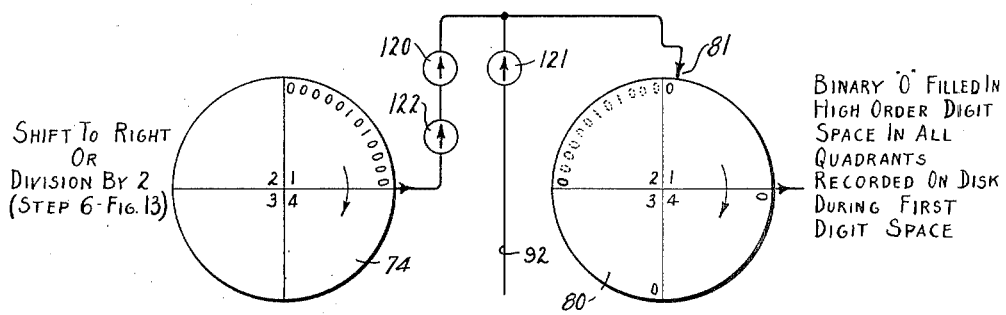
INVENTOR.
George R. Stibitz
BY
Carlson, Pitzner, Hubbard & Wolfe
ATTORNEYS Feb. 1, 1955

G. R. STIBITZ 2,701,095

ELECTRONIC COMPUTER FOR DIVISION

Filed Feb. 12, 1949

INVENTOR.
George R. Stibitz
BY
Carlson, Pitzner, Hubbard & Wolfe
ATTORNEYS

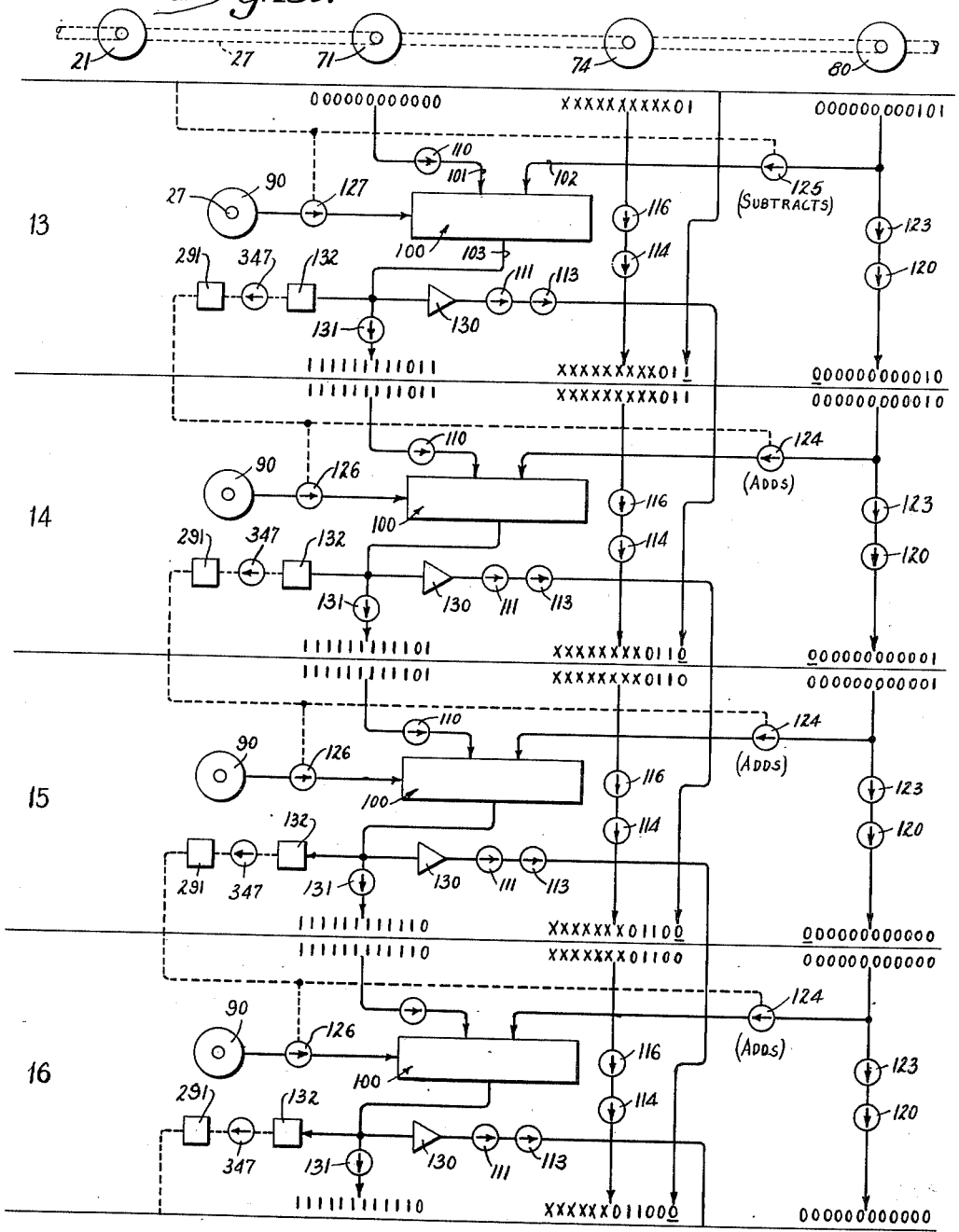

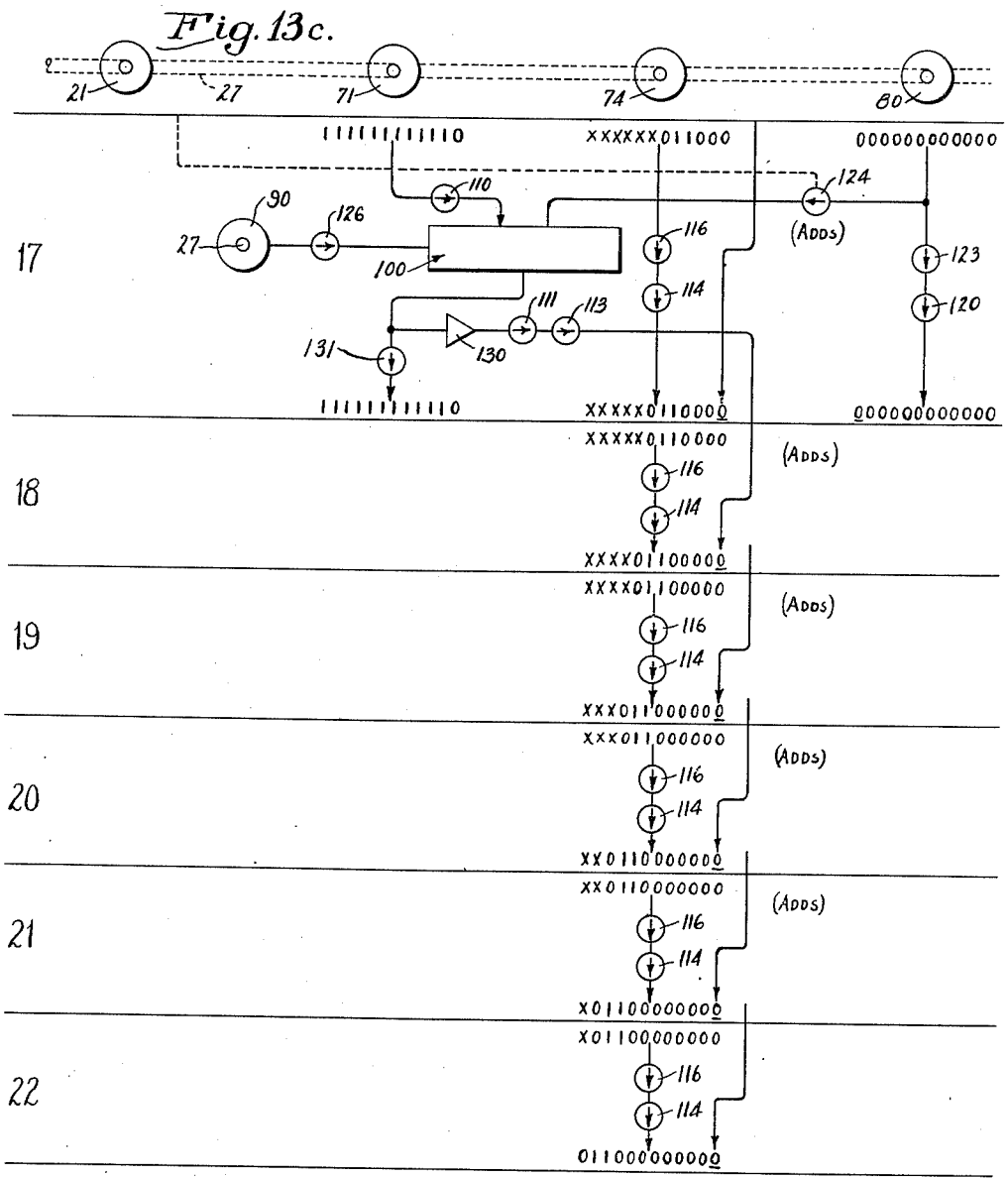

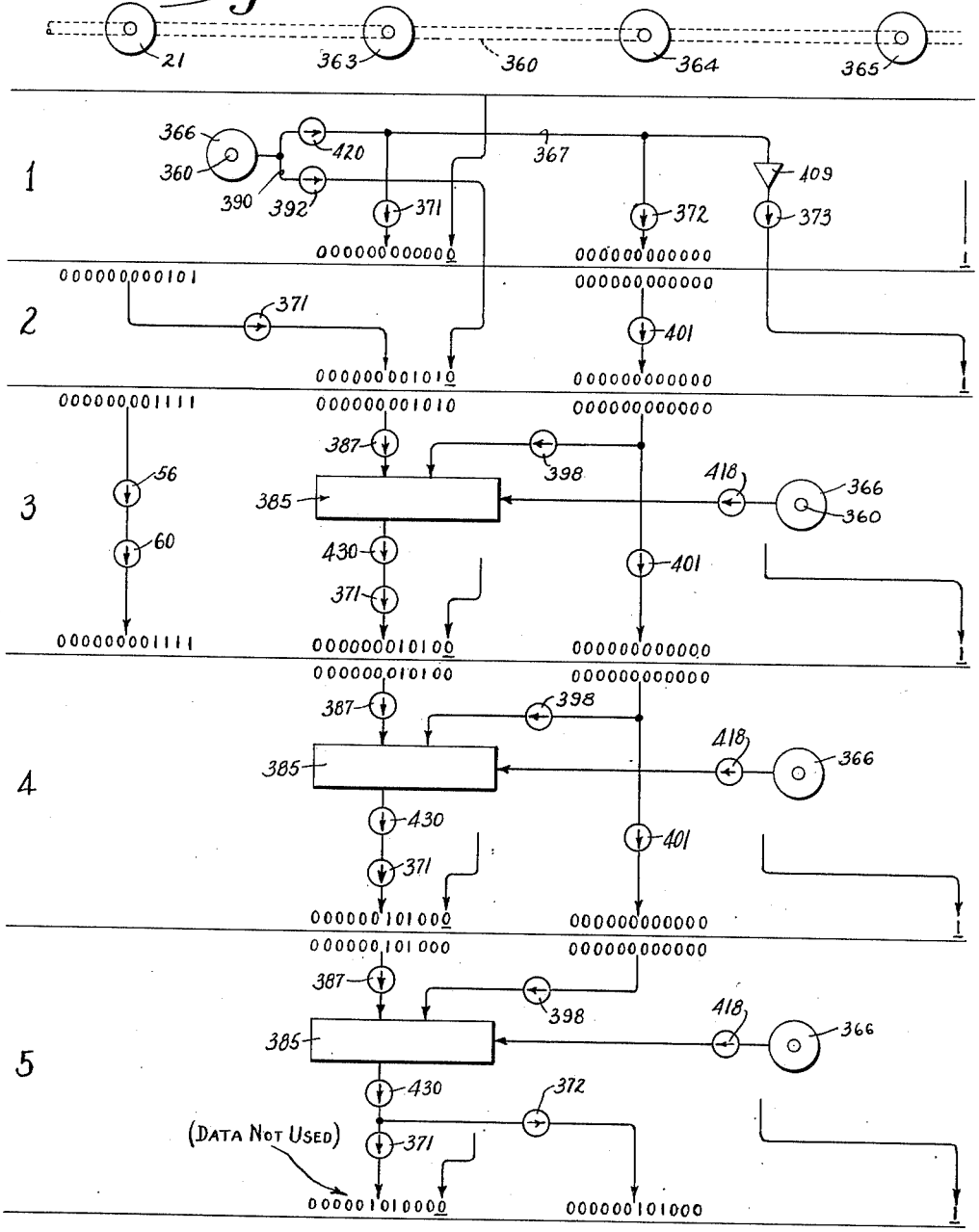

Figure 14B:
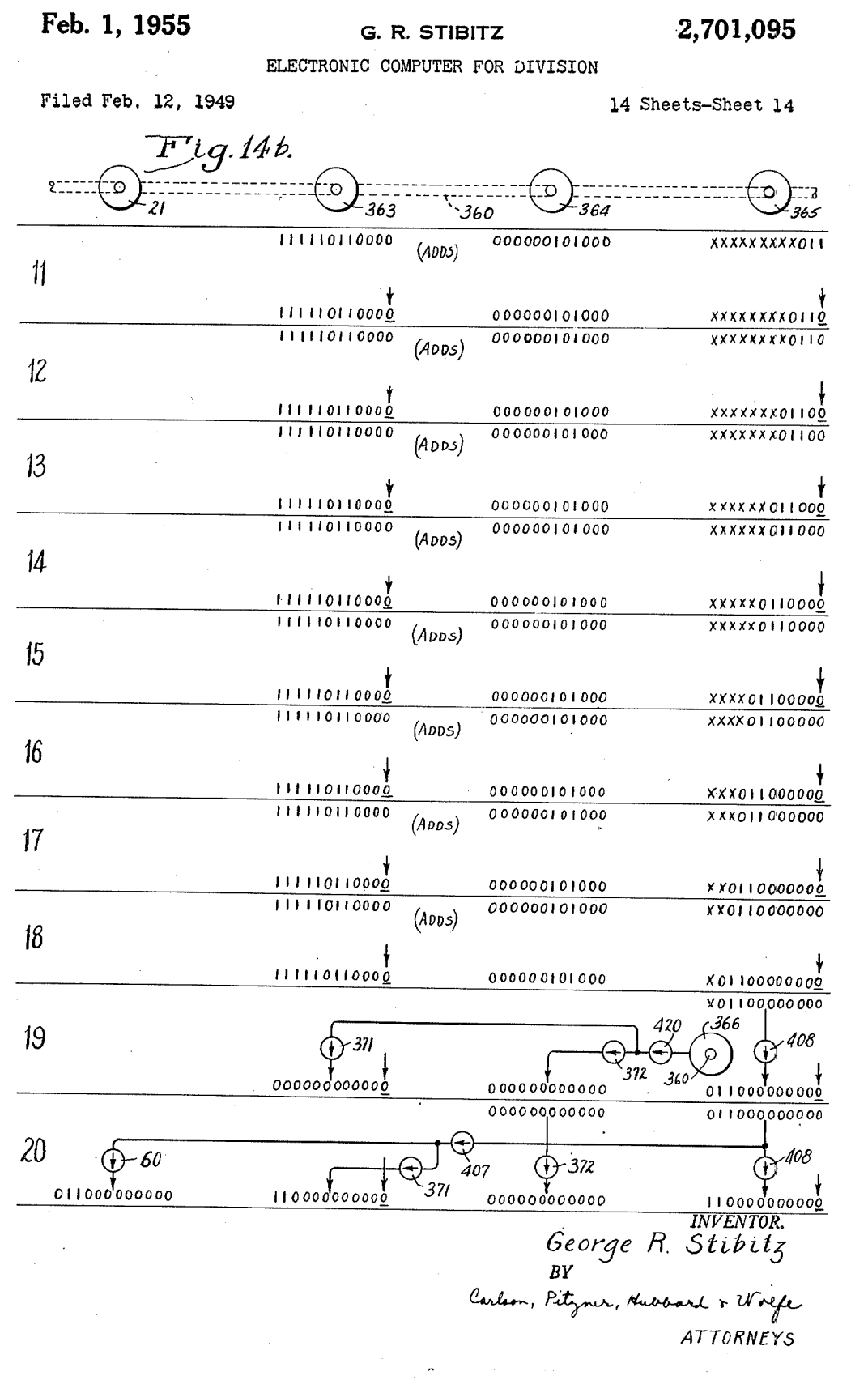

Feb. 1, 1955

G. R. STIBITZ 2,701,095

ELECTRONIC COMPUTER FOR DIVISION

Filed Feb. 12, 1949

INVENTOR.
George R. Stibitz
BY
Carlson, Pitzner, Hubbard & Wolfe
ATTORNEYS

United States Patent Office 2,701,095
Patented Feb. 1, 1955

2,701,095

ELECTRONIC COMPUTER FOR DIVISION

George R. Stibitz, Burlington, Vt.

Application February 12, 1949, Serial No. 76,088

41 Claims. (Cl. 235—61)

The present invention relates to electronic digital computers and more particularly to a device for performing the division of one binary number by another.

It is an object of the present invention to provide an improved device for dividing binary numbers accurately and at a rate of speed which is far in excess of present day commercial calculators.

It is another object to provide an improved and simplified method for dividing one binary number by another in which the steps of computation require only successive additions, subtractions and shifts of a binary number relative to its binal point. It is a more specific object to provide a method of binary division in which a tally is made of the successive additions and subtractions of a relatively shifted divisor, said tally requiring only minor correction to produce the desired quotient.

It is an object of the present invention to provide a sequential electronic computer having switches which are closed in predetermined combinations to control the flow of data in each step and in which means are provided for successively preselecting in one step the switch settings which are to be used in the following step. It is a related object to provide means capable of preselection for operating data path switches simultaneously and at precisely the beginning of a step of computation.

It is another object of the present invention to provide an electronic computer having magnetizable disks on which digits are sequentially recorded in the form of spots of magnetism and read off by an appropriate pickup head, recording and reading taking place simultaneously at different points on the same disk or on associated disks. It is a more detailed object to provide a computer having magnetizable disks in which the recording head and pickup head are advanced or retarded relative to one another in order to effect shifting of a binary number to the right or to the left with respect to its binal point.

Still another object is to provide a computer for division which is relatively simple and inexpensive to construct, which is compact, and which may be advantageously utilized as a building block in the construction of computers capable of solving all normal problems of arithmetic. Neither the mechanical nor the electrical components need be constructed with extreme precision and the electrical components are, for the most part, of the standard type used in radio receivers. The number of tubes and component parts are small compared to conventional computers of comparable speed.

It is a further object to provide an improved sequential computer for binary division utilizing devices having two stable conditions of operation in which the order of the two voltage conditions to which the devices are subjected, rather than any single instantaneous condition of voltage, determines which of the two binary digits is represented. As a result, the computer may be made self-checking and highly accurate in spite of relatively wide variations in voltage and wave form in various portions of the circuit and notwithstanding changes in the electrical characteristics of tubes and other component parts.

It is a still further object to provide a sequential computer for division having a plurality of mechanically driven elements for the storage of data and step by step solution of the problem together with a synchronized source of control impulses enabling all portions of the computer to keep in step substantially independently of variations in driving speed.

Other objects and advantages of the invention will become apparent from the following detailed description taken in connection with the accompanying drawings, in which:

Figure 1 is a simplified schematic diagram of the preferred arithmetic unit and memory unit employed for dividing numbers expressed in the binary system.

Fig. 2 discloses a control unit for supplying switch-controlling impulses to the arithmetic unit and memory unit disclosed in Fig. 1.

Fig. 4 is a simplified schematic diagram of a control unit suitable for use with the arithmetic unit of Fig. 3.

Fig. 5 is a detailed view of a portion of one of the disks shown in Fig. 1, together with a typical pickup or recording head cooperating with magnetic material on the periphery of the disk.

Fig. 5a is a detailed view of a portion of a toothed pulsing disk and cooperating head for generating control pulses.

Fig. 6 is a schematic diagram of a typical amplifier suitable for amplifying the output of a pickup head as shown in Fig. 5 and for producing a corresponding output signal of square wave form. This amplifier includes means for integrating the pickup voltage.

Fig. 7 shows a typical amplifier used in conjunction with a recording head.

Fig. 8 shows a flip-flop circuit of the type employed in practicing the present invention.

Fig. 9 discloses a typical electronic switch employed for controlling the flow of data in the arithmetic unit.

Figure 1:
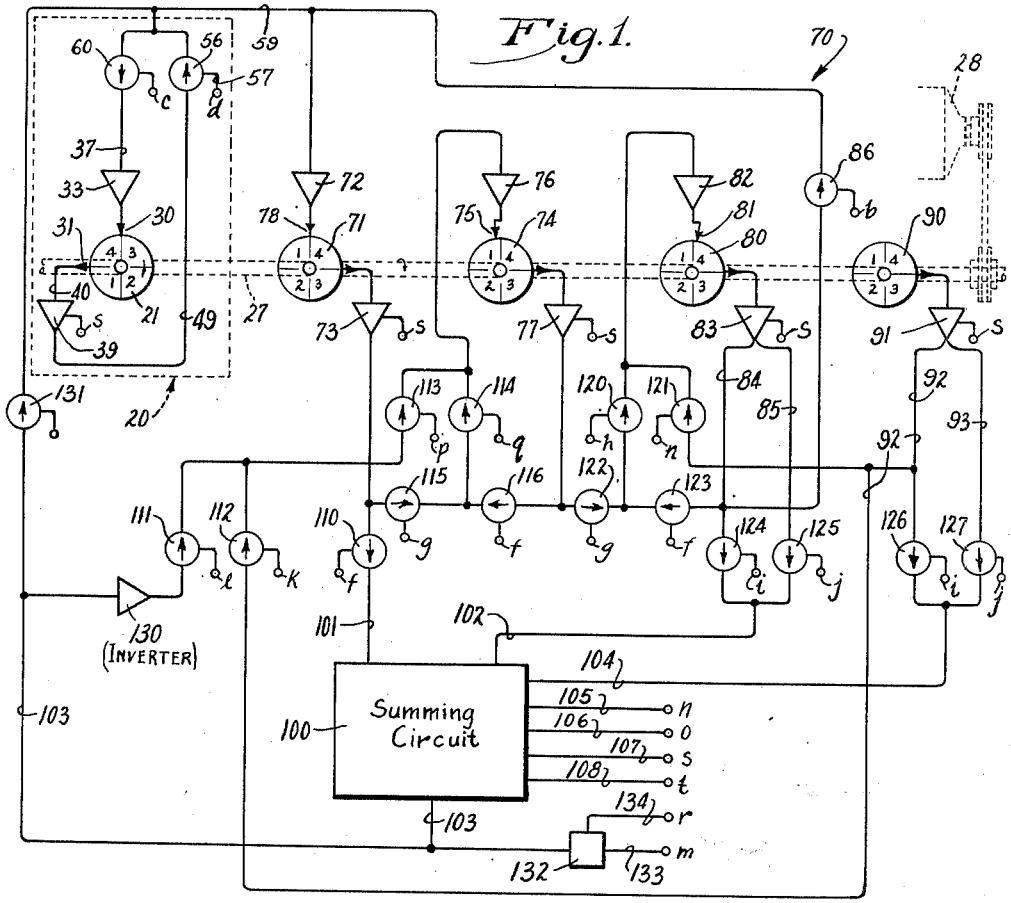
Figure 3:
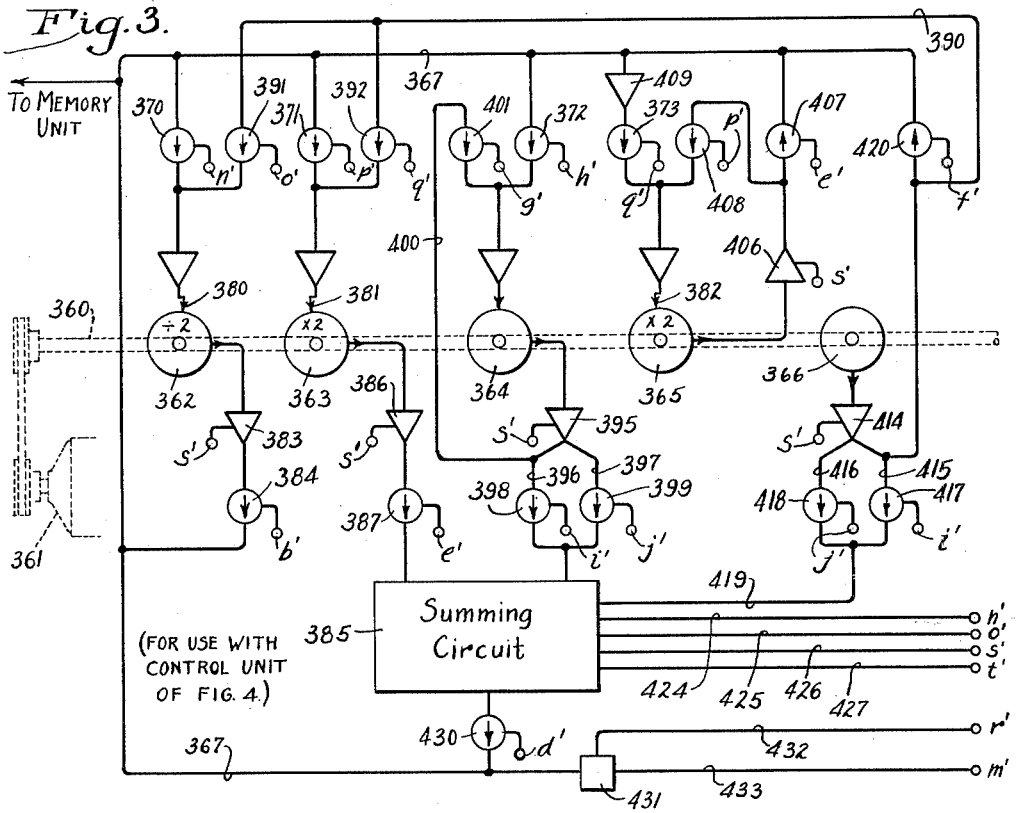
Fig. 3 is a simplified schematic diagram of an alternative arithmetic unit.
Figure 10:
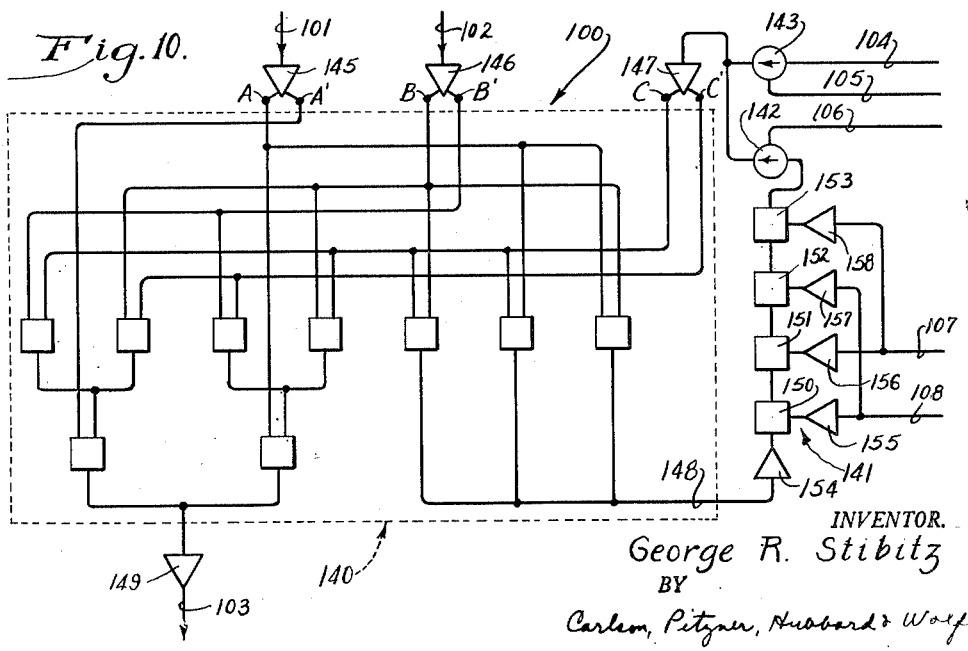

Fig. 10 discloses a simplified schematic diagram of the summing circuit used in the arithmetic units of Figs. 1 and 3.

Figure 11:
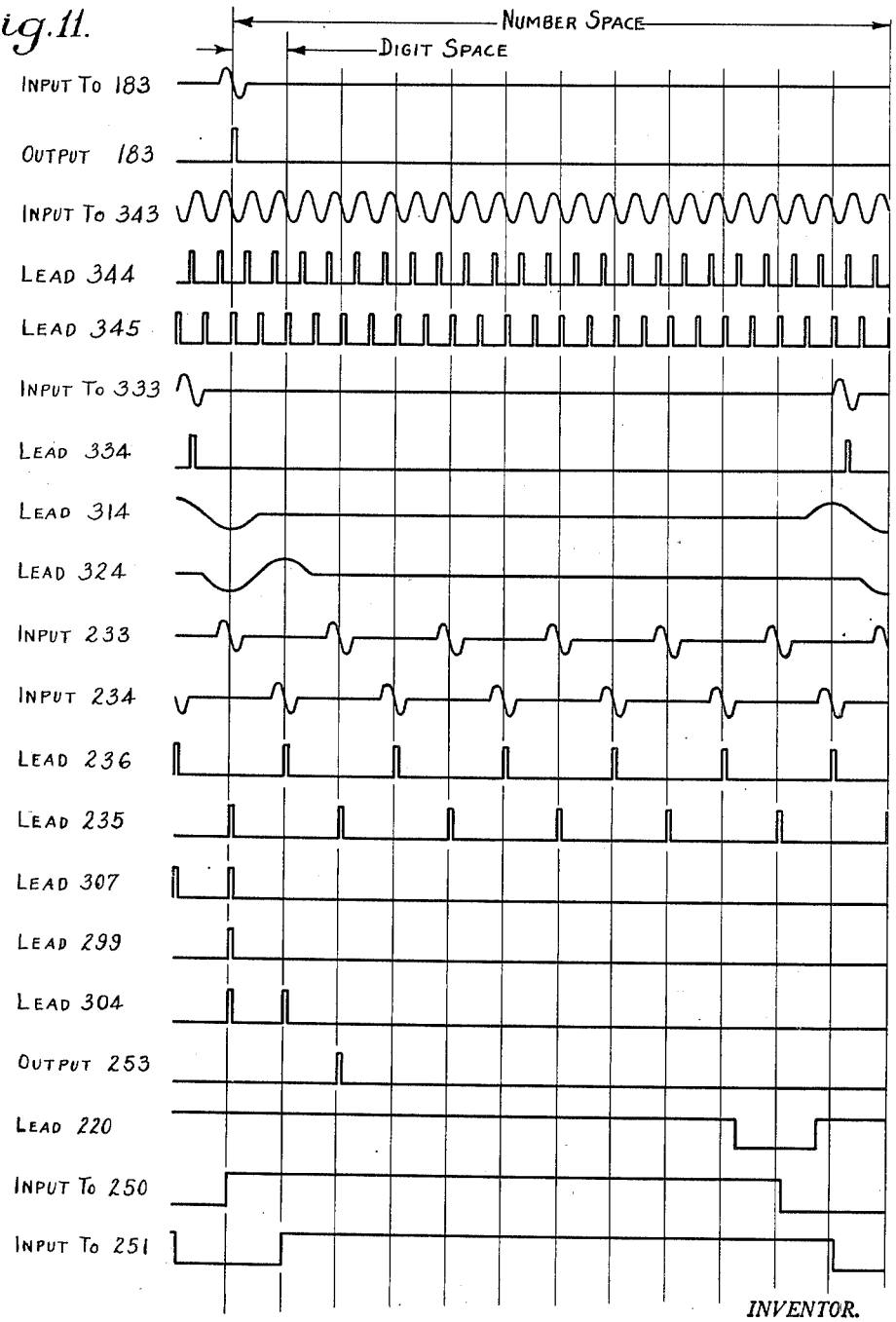

Fig. 11 shows the wave forms existing at various significant points in the circuit of Figs. 1 and 2 during the solution of a practical problem.

Fig. 12 illustrates the transfer of a binary number from one disk to another without shifting.

Fig. 12a shows the transfer of a binary number from one disk to another with the recording head on the second disk displaced to produce a shift of the number to the left relative to the binal point.

Fig. 12b is similar to Fig. 12a except that the recording head is displaced oppositely to produce a shift of a binary number to the right relative to its binal point.

Figs. 13, 13a, 13b and 13c constitute a data flow diagram illustrating the flow of data in the circuit of Figs. 1 and 2 during each step of a sample calculation.

Figure 14A:
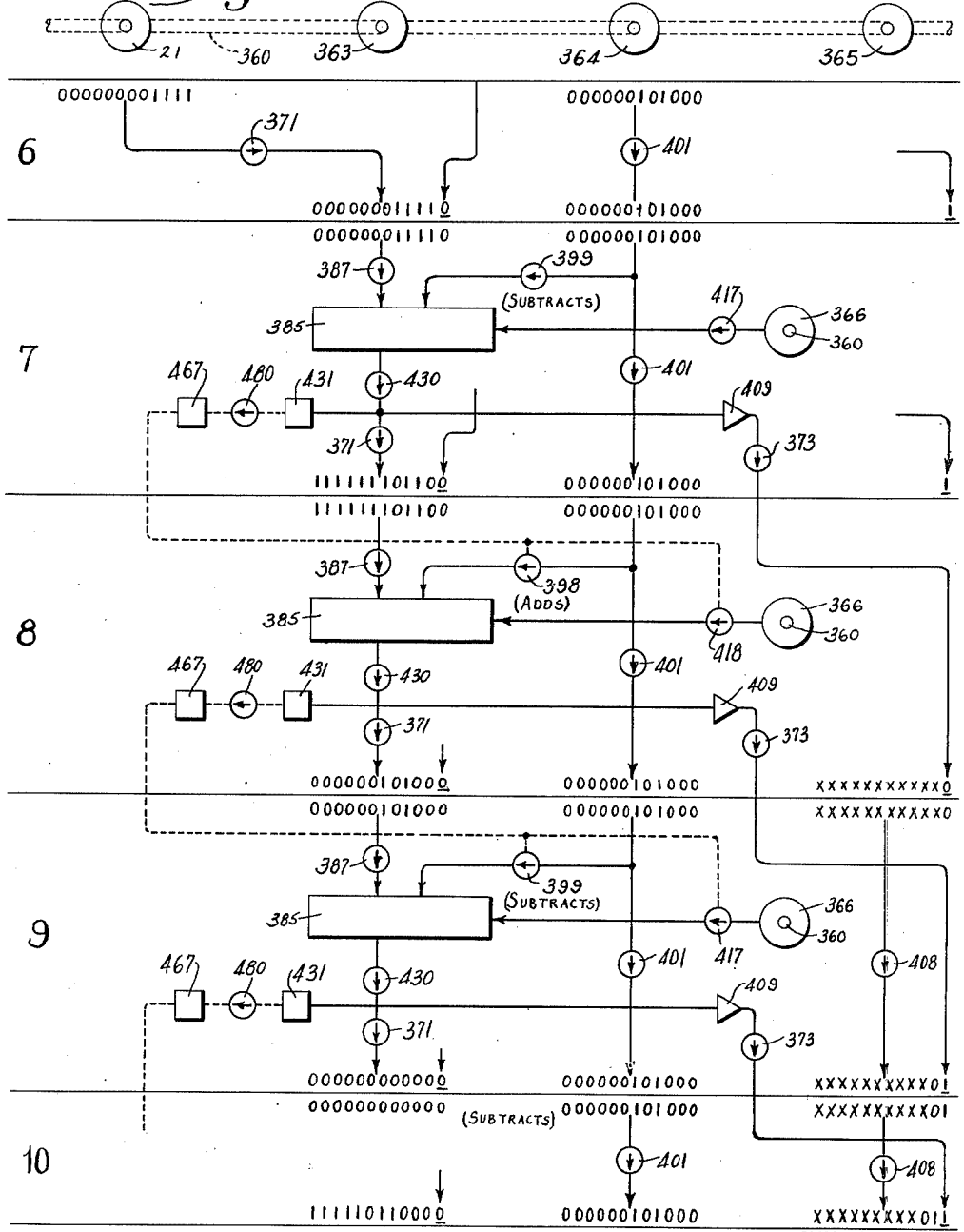

Figs. 14, 14a and 14b constitute a data flow diagram similar to the foregoing and applicable to the arithmetic and control units of Figs. 3 and 4.

In the drawings a circle represents a vacuum tube switch with the arrow showing the direction of data flow, a square indicates a flip-flop circuit and a triangle, an amplifier or cathode follower. The recording and pickup heads are shown for simplicity as arrows associated with the driven disks.

While the invention is susceptible of various modifications and alternative constructions, I have shown in the drawings and will herein describe in detail only certain preferred embodiments of the invention. It is to be understood, however, that I do not intend to limit the invention by any such disclosure but aim to cover alternative constructions and uses falling within the spirit and scope of the invention as expressed in the appended claims.

The computer to be described employs the binary system of numbers and it will be assumed that such system is sufficiently well known to persons skilled in the computer art as not to require discussion. Complete information on the binary system may be obtained from texts concerning the theory of numbers and general mathematics texts. As is conventional, the two binary digits employed will be referred to as 0 (zero) and 1 (one) in the discussion which follows.

Electronic computers employing binary numbers are known and have been useful in the calculation of trajectory and for solving other lengthy mathematical problems. They have for the most part been relatively complicated and expensive, requiring so many vacuum tubes and related components and occupying so much space as to prohibit their use in the average business establishment. Since the computer disclosed herein acts upon successive binary digits sequentially and in a novel manner to produce the quotient of a problem in division, the number of electronic components is much smaller than previously required for the solution of practical problems. For this and other reasons the present computer will be found to be eminently suited for use in industry in performing payroll calculations and the like. By adding only a few components and by employing a novel scheme for multiplication as covered in my co-pending aplication, Serial No. 157,369, filed April 21, 1950, on Computer for Multiplication, it is possible to adapt the present computer to perform all normal arithmetic problems. The computer to be discussed is well adapted for use as a building block in the construction of computers to solve problems of almost any degree of complexity.

For purposes of convenience, the computer will be arbitrarily divided into three sections which may be termed the memory unit, the arithmetic unit and the control unit. The memory unit serves to store the raw data in the form of spots of magnetism on a movable magnetic element, preferably a rotating disk. Pickup and recording heads are used in cooperation with the disk or the like to read off the data as required in the solution of a mathematical problem and to later record the answer. Both of these operations are controlled by operating electronic switches associated with the recording and pickup heads. It will be assumed in the following description that data has previously been recorded on the disks in the memory unit by any desired means.

The arithmetic unit receives the raw data from the memory unit in the form of a series of voltage impulses, modifying it in a predetermined manner to produce the answer to a problem in division. The procedure for acting upon the data is partially determined by means of a set of control data previously recorded on magnetic tape or the like. The answer is recorded in the form of magnetic spots on a disk which may, if desired, be the same as that from which the problem data was previously read. During the course of arriving at an answer to a problem, electrical impulses corresponding to the recorded spots of magnetism and in the form of discrete voltage waves or "couples" are routed in a predetermined manner through the arithmetic unit, being successively recorded on and read from rotating magnetic disks. In performing the process of division, a summing circuit is used to obtain the sum of or difference between the various binary numbers involved. Moreover, binary numbers are multiplied or divided by two, in other words, shifted to the left or right relative to the binal point, by proper placement of the recording and pickup heads about the periphery of the magnetic disks.

The routing of the binary numbers through the summing circuit and through the multiplying and dividing disks, as well as through the various other circuit components, is controlled by the control unit. The latter includes means synchronized with the memory disks for unlocking the switches in the arithmetic unit in proper sequence and for the proper time interval. It will be appreciated, however, by one skilled in the art that the unlocking sequence is not completely predeterminable but is dependnt upon the condition of the data during the intermediate steps in the solution of the problem. The arithmetic and control units thus may be said to interchange data between them to effect a solution. Throughout the discussion which follows it will be understood that data is represented electrically in the form of voltage couples just as in the computer described in my co-pending aplication Serial No. 34,968, filed June 24, 1948, on Computer for Addition and Subtraction, and which issued at Patent No. 2,609,143 on September 2, 1952. A binary 1 may be represented by a plus-minus couple, while a binary 0 is represented by a minus-plus couple. Similarly, a binary 1 may be magnetically represented on a disk by a north-south magnetic couple, while a binary 0 is represented by a south-north couple. In short, the sequence of the voltages (or magnetic polarities) comprising a couple and not the magnitudes thereof determines the binary digit. Reference is made to the above application for discussion of the advantages inherent in this manner of representing data.

PROCESS OF DIVISION

In the practice of the present invention, the process of obtaining the quotient of two binary numbers differs from what is conventionally known as "long division." Instead I have found that the process of obtaining a quotient may be performed by first adjusting the magnitude of the divisor relative to the dividend and then performing a series of additions and subtractions of the divisor from the dividend and from the successively produced remainders with the divisors shifted relatively one place to the right after each addition or subtraction. A binary 1 is tallied whenever a subtraction is performed and a binary 0 for each addition to produce an uncorrected quotient; then a number of simple corrections are performed to produce a true, corrected quotient. More specifically, the steps which are performed by the computer disclosed herein in obtaining a quotient are as follows:

(1) The numbers are preliminarily adjusted to the right or left. The first and most important adjustment is to shift one of the numbers so that the divisor is larger than the dividend, making a quotient of less than unity. The mathematical justification for this will later appear. In order to achieve maximum accuracy the relative adjustment should cause the numbers to be as nearly as possible equal in magnitude, consistent with producing a quotient of less than one. The net shift should be noted, enabling a corresponding change to be made in the quotient after it is obtained. To further insure accuracy, and to make full use of the capacity of the machine, the numbers should be moved jointly to the left as far as possible. Shifting all the way to the left is to be avoided, however, since the high order digit is employed for representing sign.

(2) Next a novel division-like process is performed in which the divisor is first subtracted from the dividend. Upon making such subtraction, a binary 1 is noted as the first digit in the uncorrected quotient. This initial binary 1 is always discarded as an incident to obtaining the final answer and therefor need not be recorded and is not recorded in the present computer. The subtraction produces a negative remainder. The divisor is next shifted one place to the right relative to the remainder. Since the remainder from the previous step is negative, the shifted divisor is algebraically added thereto to produce a new remainder. Because an addition was performed, a binary 0 is tallied or recorded as the second digit in the uncorrected quotient. The divisor is again shifted to the right relative to its binal point and applied to the remainder from the previous step. If the remainder is negative, addition is performed and a binary 0 is entered as the next digit in the uncorrected quotient, while if the remainder is positive, the divisor is subtracted and a binary 1 is entered in the uncorrected quotient as the next digit. This process is repeated, each time shifting the divisor one place to the right and either adding it to or subtracting it from the previously obtained remainder. In this way, the remainder will be constantly reduced in magnitude, although it may either be positive or negative in sign. This process is repeated until the desired number of binal places has been obtained in the uncorrected quotient.

In the invention in its preferred form negative binary numbers are indicated by the complement. The capacity of the computer is sufficiently great so that there will be one or more idle spaces in the higher orders filled up with binary 0's when the number is positive and binary 1's when the number is negative. The digit of highest order in the remainders thus may be utilized as an indicator of sign and, more importantly, as a tally of whether the shifted divisor is to be added or subtracted. In carrying out the improved method of division it will be seen that the high order digits of the respective remainders when inverted become the digits of the quotient.

(3) The uncorrected quotient obtained as the result of the foregoing operation has the form 1.0 . . . the spaces to the right of the 0 constituting the significant digits in the answer. Such uncorrected quotient is next corrected by shifting it one place to the left relative to the binal point and then disregarding those digits to the left of the binal point. (As was mentioned earlier, in the computer described herein, the 1 resulting from the initial subtraction is not recorded since it is not required for the significant digits of the answer.) This produces a semi-corrected quotient which consists of the correct significant digits but which must be further corrected in order to compensate for the adjustment of the binal point made in step (1). Thus, assuming it was necessary in step (1) to shift the dividend one place to the right relative to its binal point in order to make it less than the divisor, the quotient should be shifted one place to the left to compensate and to produce a final corrected quotient.

MEMORY UNIT

The memory unit used for storage purposes in the present computer is indicated at 20 in Fig. 1. It includes a rotating disk 21 having a magnetic periphery on which the data is stored in the form of north and south "couples" of magnetism. This disk is rotatively driven by means of a shaft 27 powered by a driving motor 28 which rotates at a nearly constant speed which may be on the order of 1800 R. P. M. Cooperating with the periphery of the disk 21 is a recording head 30 which serves to magnetize the disk in response to variations in the exciting current. Spaced around the periphery from the recording head 30 is a pick-up head 31 which produces a voltage corresponding to the polarity of the magnetic spots on the disk. With regard to the disk and cooperating heads, reference is made to Fig. 5 where it will be noted that the head 30 on the disk has a core structure 30a and a pair of coils 30b, the magnetism being concentrated in the narrow air gap 30c along successive elements of the disk periphery. When the head is used for pickup purposes, the coils are arranged in series for greater sensitivity. However, when the head is used for recording purposes, the coils are separately and oppositely energized. More detailed discussion of this portion of the apparatus is to be found in my co-pending application Serial No. 34,968, filed June 24, 1948.

In order that recording may take place at a reliably high level, the recording head 30 is energized by a recording amplifier 33. As shown in Fig. 7, such amplifier preferably includes a pair of vacuum tubes 34, 35, the plates of the latter being connected directly to the coils 30b. The input lead 37 is connected to the grid of the tube 34, while the grid of the tube 35 is controlled by the plate circuit of a tube 34. A diagonally connected resistor 38 associates the plate of the first tube with the grid of the second. It will be apparent, therefore, that when a positive voltage is applied to the grid of the tube 34, a large amount of plate current will be drawn energizing the left hand coil 30b on the head. Simultaneously, the plate of the tube 34 swings negatively, thereby reducing the flow of plate current in the opposite leg 30b. Conversely, when a negative voltage is applied at the input, the tube 34 becomes non-conducting and the tube 35 heavily conducting, resulting in a reversal of the magnetism in the core 30a of the head 30. In this way, a plus-minus voltage couple applied to the input results in the recording of correspondingly polarized spots of magnetism on the disk as the latter rotates.

Since the amount of magnetism which may be imparted to the disk is rather small, it is necessary to amplify the output of the pickup head 31. This is accomplished in the pickup amplifier 39 which is set forth in schematic form in Fig. 6. As the magnetized spots on the disk 21 are moved past the air gap, the flux set up in the magnetic circuit thereof induces a voltage in the coil proportional to the rate of change of flux. The latter voltage is applied to the input terminal 40. After amplification by a tube 41, this voltage is integrated by a capacitor 42 and resistor 43, the voltage across the capacitor being then proportional to the flux. This voltage is further amplified by tubes 44, 45 and 46 and applied to the grid of the following stage. This following stage consists of a flip-flop circuit having tubes 47, 48. The plate of the tube 48 is connected to the output terminal 49 of the amplifier. The flip-flop circuit remains in one of two stable conditions except when a positive "unlocking" pulse is applied. This unlocking pulse is received through an unlocking terminal s which is connected to a cathode follower 51. The output of the latter is connected to the cathode terminals of the flip-flop tubes 47, 48. Whenever an unlocking pulse is received at the unlocking terminal s, both of the tubes in the flip-flop circuit are cut off and become non-conducting. When the unlocking pulse in removed, the flip-flop stage will assume a condition which is dependent upon the then existing condition of the voltage at the input. As will later appear, the flip-flop stage receives an unlocking pulse once for each magnetized spot on the disk 21 so that the output of the pickup amplifier at 49 is a full square wave of voltage for each digit.

During the normal operation of the computer, the voltage output of the amplifier 39 is fed into an output line or bus 59 via a switch 56. When the switch 56 is closed, the signal from the disk will be applied to the input line 59, with similar switches being used to feed the data into other portions of the circuit. When it is desired to feed data from the line 59 onto the disk 21, the circuit from the line to the recording amplifier 33 is completed through a switch 60. To re-record a number on the disk 21 in shifted position, it is sufficient merely to close the switches 56, 60 to form a simple loop circuit.

The schematic diagram for the switches 56, 60 is to be found in Fig. 9, the switch 56 being taken as representative. In its simplest form it includes a pair of triodes 65, 66 having a common cathode resistor 67. The operation of the circuit is as follows. When the control lead 57 is positive, the triode 66 conducts heavily through the cathode resistor 67, thereby biasing the other triode 65 to cutoff. Under such conditions, the output voltage remains constant regardless of the variations in the input and the switch may be considered "off." Conversely, when a negative voltage is applied to the control terminal 57, very little current flows through the cathode resistor 67, and the variations in the output voltage correspond to the variations in voltage at the input terminal 49. The switch is then "on." There will, of course, be a 180° phase reversal in the switch, but this is unimportant since it may be compensated for merely by taking the input for the switch from the opposite plate of the flip-flop circuit feeding it. In some cases, a switch may not derive its input directly from a flip-flop, but in these cases the phase can be reversed at some other point in the circuit before it is again recorded on a disk. The switch illustrated is preferred since it is simple and reliable. However, it will be apparent to one skilled in the art that other specific electronic switches may be employed which include no phase reversal without departing from the invention. Also, additional units such as the unit 20 may be connected to the bus 59 in exactly the manner shown in Fig. 1. For the sake of simplicity, however, only one memory unit will be sufficient to understand the operation and to solve a typical problem.

ARITHMETIC UNIT

The arithmetic unit occupies the remainder of Fig. 1 and has been given the general designation 70. This unit is fed data in the form of voltage couples from the memory unit 20 via the line 59 and is arranged not only to add and subtract binary numbers, but also to shift numbers relative to the binal point between the various additions and subtractions, producing an answer which is the quotient of two binary numbers appearing successively at the input terminals. The successive steps in which such mathematical operations take place are determined by the setting up of the switches located throughout the circuit in various combinations. Both the control unit for controlling the operation of such switches and the mathematical justification for the various operations employed to produce the answer to a problem of division will be covered in subsequent sections.

It will be useful at the outset to describe the arithmetic unit 70 purely from the standpoint of the physical components contained therein. In the present embodiment, four disks are used, all of these being rigidly mounted on the rotating shaft 27. The first disk 71 is used for temporary storage of data between successive mathematical steps and has associated therewith a recording amplifier 72 and a pickup amplifier 73. For purposes of convenience the disk is divided into four quadrants with space for the recording of four binary numbers. In the example to follow it will be assumed that each number is 12 digits in length, although computers of this type may be constructed to accommodate numbers 25 digits in length or even longer. It will be convenient in referring to disk 71 to speak of it as having four "number spaces" on its periphery each made up of 12 "digit spaces." These terms will also for convenience be applied to the time intervals required for rotation of the disk through corresponding degrees of arc.

The next disk is a multiplying disk 74 which is employed for retarding a binary number one digit, in other words, for shifting the number one binal place to the left. For this purpose, the recording head 75 associated therewith is retarded or backed off one digit space relative to the pickup head. As in the previous stage, the disk 74 has a recording amplifier 76 and a pickup amplifier 77 associated therewith. The latter amplifiers are essentially the same as those previously described in connection with Figs. 6 and 7.

The next disk rigidly coupled to the shaft 27 is the disk 80. This disk may be termed a dividing disk since it is employed to shift a binary number to the right one space relative to the binal point. To this end, the recording head 81 is advanced about the periphery one digit space in the direction of the pickup head. A recording amplifier 82 is used which is similar to the recording amplifiers previously discussed. The pickup amplifier 83 is also similar to the previously-mentioned pickup amplifiers shown in Fig. 6 except that it includes two output terminals, a direct lead 84 and an inverted lead 85. Referring to Fig. 6, these output terminals are connected to the respective plates of the tubes 47, 48 in the flip-flop circuit. The voltages applied thereto will thus be equal, but opposite in polarity or phasing. The direct lead 84 is connected to the main bus 59 by means of a switch 86.

The remaining disk shown in Fig. 1 may be termed a zero generating disk, and has been designated by the numeral 90. This disk is permanently magnetized with a series of magnetic couples representative of binary 0's or, if desired, may include magnetized teeth. This disk has a pickup amplifier 91 in its output circuit having dual output leads 92, 93 just as discussed in connection with the amplifier 83. With the amplifier 91 unlocked by application of voltage to an unlocking terminal, a series of couples representative of binary 0's will appear on the lead 92, while a series of couples representative of binary 1's will appear on the lead 93. The flow of these digits into the remainder of the circuit is under the control of switches to be subsequently discussed. The components 90—93 referred to form a part of a digit inserter. The purpose of the digit inserter is substantially the same as set forth in my co-pending application Serial No. 157,359 of which mention has been made, namely, to fill in binary 0's wherever required and to add a low order binary 1 in obtaining the complement of a binary number. In the case of each of the pickup amplifiers 39, 73, 77, 83, and 91, unlocking takes place in unison at each half of the couple to produce a square wave output. Consequently, all of the unlocking terminals have been designated with the letter s and all are pulsed in unison. The means for supplying the unlocking pulse will be discussed in connection with the control unit (Fig. 2).

The addition and subtraction of binary numbers as required in the process of division is performed by a summing circuit 100 shown at the bottom portion of Fig. 1. This circuit includes a first input lead 101 and a second input lead 102 which carry the respective binary numbers to be added. The voltage couples representative of the sum appear at the output lead 103, being subsequently conveyed to a rotating disk and there at least temporarily recorded. Digits for insertion in the lowest order for corrective purposes are supplied through a lead 104 while control voltages for controlling the insertion of such digits are applied to leads 105, 106. As covered in the above-mentioned applications, it is also necessary to suppply a summing circuit 100 with control pulses for operating a delay chain to enable the carrying of a digit from one order to the next higher order. These pulses are supplied on leads 107, 108. The terminals for the control and pulse leads have been designated n, o, s, and t respectively, and are supplied from correspondingly lettered terminals in the control unit (Fig. 2). The specific circuit employed in the summing circuit 100 will be described in connection with Fig. 10.

A complete calculation takes place in a series of steps, and paths are provided in the circuit to insure that the data flow takes place in each step in a predetermined manner between the rotating disks and summing circuit. Such paths are provided by a plurality of electronic switches, each having a control terminal which is controlled by the control unit to cause the circuit to be closed or open. The switches are identical and have a circuit corresponding to that which was previously discussed in connection with Fig. 9. The switch 110 controls the flow of data from the disk 71 to the input lead 101 of the summing circuit. The switches 111, 112, 113, 114, 115, 116 are used in the input or recording circuit of disk 74. Similarly, the switches 120, 121, 122, 123 are used at the input of the dividing disk 80 to enable data to be controllably fed thereto from various portions of the circuit. Each of these switches is operated by the control unit and has a correspondingly lettered control lead.

In order to enable the summing circuit 100 to effect a subtraction of two binary numbers, switches are provided at the input lead 102 to enable a binary number or its complement to be used. These switches are associated with leads 84, 85 and have been designated 124, 125 respectively. Further, it is desired that the low order digit used for corrective purposes and entering the summing circuit by a lead 104 be either a binary 0 or a binary 1. For this purpose a switch 126 connects the summing circuit to the lead 92 from the zero generating disk 90 enabling a binary 0 to be fed into the summing circuit while a second switch 127 may be closed to connect the lead 93 which carries a series of binary 1's. It will be understood, of course, that only an initial couple corresponding to a binary 0 or 1 will be required for a given step in the calculation.

Completing the diagram of Fig. 1, an inverter 130, used for writing a quotient digit in anticipation of what is to be done in the next step, is connected to the output of the summing circuit. The information therefrom may be recorded on disk 74 via switches 111, 113. Switch 113, however, will be turned on to record only the high order digit. Also associated with the write lead 103 is a switch 131 which enables the write signal to appear on the main bus 59 for recording the same on disk 21 or 71. In order that data might be fed from the arithmetic unit to the control unit for controlling the intermediate operations of the latter, the write lead 103 of the summing circuit is fed through a locked two-condition device 132 having an output lead 133 leading to a terminal m. This device includes an unlocking lead 134 having a terminal r. The latter terminals, just as in the case of the other control terminals in Fig. 1, are lettered to correspond to the output terminals of the control unit (Fig. 2).

Operation of the two-condition device 132 will be apparent by reference to the schematic diagram in Fig. 8. Here it will be noted that the circuit is somewhat similar to the well-known Eccles-Jordan flip-flop circuit, using a pair of triodes 135, 136 having diagonally coupled grids and plates. Thus the circuit will remain in one of its two stable conditions, namely, with one of the triodes conducting heavily and with the remaining triode substantially non-conductive. The device differs from the conventional Eccles-Jordan circuit however in an important respect. In the latter circuit application of a positive pulse causes the circuit to switch from its existing stable condition to its alternate condition. Each pulse results in a change of condition. In the present device, by contrast, a separate input lead is provided, here input lead 103, which controls the condition to be assumed by the circuit and the pulse lead 134 simply unlocks the circuit so that the input lead may assert itself. More specifically, with the circuit arranged as shown, the input lead 103 is ineffective to establish control, and the voltage thereon may change back and forth without affecting the condition of the circuit. However, when a positive or unlocking pulse is applied to the lead 134, both tubes become momentarily non-conducting and the subsequent condition of the circuit, i. e., which tube will conduct, depends upon the then-existing voltage on the input lead.

Turning now to the summing circuit 100 in the arithmetic unit, the schematic diagram will be found in Fig. 10. This circuit may be conveniently broken down into a digit adder 140, included within the dotted outline, a carry delay chain 141 and switches 142, 143 used for low order digit insertion. The digit adder 140 is essentially the same as that disclosed in Fig. 11 of my above-mentioned co-pending application Serial No. 34,986, the input terminals being designated A, B, C and A', B', C' to correspond thereto. These terminals carry the respective direct and inverted input signals. Inversion is accomplished by any desired phase-inverting amplifier, the three amplifiers used in the present circuit being designated 145, 146, 147. Suffice it to say that voltage couples representative of binary digits are simultaneously applied to the input terminals 101, 102. The sum then is passed through a conventional cathode follower 149 and appears at the write output lead 103. Any carry digit resulting from such summation appears at the carry output lead 148 and is appropriately delayed by the carry delay chain 141 until the instant when the digit adder is ready to sum up the digits of the next higher order. At such time the digit which has been carried, and which is either a binary 1 or a binary 0, is applied through the switch 142 to the carry input leads CC'.

Insertion of the digit which has been carried is precisely synchronized with the digits entering the summing circuit by leads 101, 102 by means of the four serially arranged flip-flop circuits 150—153. These are successively unlocked at intervals of a quarter of a digit space by means of accurately timed unlocking pulses applied to the leads 107, 108. In order to insure positiveness of operation, amplifiers 154—158 are used at the beginning of the carry delay chain and in series with the unlocking leads.

As described in my aforesaid Patent No. 2,609,143 of September 2, 1952, it is necessary to insert a binary 0 into the digit adder in place of the carry signal for the low order digit when two positive numbers are to be added; and it is necessary to insert a binary 1 in place of the carry signal for the first digit of a subtraction problem when the complement of one number is to be added to another number. Such low order digit insertion can be readily effected in the present circuit by opening the switch 142 and closing the switch 143 just prior to the first digit space, whereupon a binary 0 or 1 will be applied to the carry input leads CC'. As previously noted in connection with Fig. 1, whether a binary 0 or a binary 1 is inserted, is determined by the selection of switches 126, 127.

CONTROL UNIT

As was stated in connection with Fig. 1, the process of division takes place in a series of steps and for each one of these steps data must be routed in a predetermined manner through selected paths in the arithmetic unit. Each step thus requires the applicable switches to be preset at the instant that a given step begins and, in general, to remain set until the beginning of the next step at which time a different combination of switch settings is required. This is one of the primary functions of the control unit which is set forth in block form in Fig. 2.

The control unit includes a series of control disks which are mounted for rotation with the shaft 27. The shaft 27 is, of course, an extension of the shaft which is shown in Fig. 1. This shaft also serves to drive a member which carries stored program or control data for setting the various switches in the arithmetic unit. Preferably such data is stored magnetically spaced along a tape 170. The latter is driven through a sprocket 171 which is coupled to the shaft 27 by means of a clutch 172. This is to enable the tape to be stopped and started at will in synchronism with the feeding of problem data into the remainder of the computer. Preferably, the tape 170 includes the data in the form of magnetic spots arranged in the form of north-south or south-north magnetic couples just as on the periphery of the data disks of Fig. 1. To compensate for different lengths of control tape which might be required for different programs of calculation, the tape is passed over a takeup mechanism 173. Control impulses are read from the tape by means of the pickup head 174 and associated amplifier 175. The latter may be of conventional type, producing a sinusoidal output which corresponds to the variations in flux along the tape.

Prior to discussing the main portion of the control unit, it will be helpful to refer briefly to the means here used for controlling the clutch 172. This clutch is a so-called B clutch which is energized upon the application of voltage to an input lead 176. The clutch itself is discussed in considerable detail in United States Letters Patent No. 2,013,649 dated September 10, 1935. Since the shaft 27 normally rotates at a speed on the order of 1800 R. P. M., it is, of course, necessary that the clutch be both rapid and positive in engagement and it is further desirable for foolproof operation that the clutch be energized at a predetermined phasing relative to the positioning of the shaft 27. This is accomplished in the present instance by means of a clutch control disk 180 having a single magnetic discontinuity, here tooth 181. The latter sweeps past a pickup head 182 once per revolution, changing the reluctance of the pickup head and producing a voltage impulse which is amplified by an appropriate amplifier 183. The pickup head 182, as well as the remaining pickup heads used in conjunction with toothed wheels in the control unit, is shown in detail in Fig. 5a. The head may be quite similar to that shown in Fig. 5. A bar magnet 189 or the like is used to provide a steady state flux. The amplifier 183 may, if desired, include means for peaking the output. Regardless of the type of amplifier or peaking means used, it is desirable that the output pulse be both abrupt and large in amplitude so that positive operation of the control switches or flip-flop circuits is assured.

The output of the amplifier 183 serves to unlock a flip-flop device 184 having input leads 185, 186 and an output lead for feeding into the clutch control lead 176. This flip-flop device may be the same as that disclosed in Fig. 8 except that the additional input lead is connected to the grid of the second tube. A switch 188 in the input circuit enables a positive switching voltage to be applied to either of the input leads. In operation, throwing the switch to the "on" position will, of itself, have no effect until the flip-flop circuit is unlocked by a pulse derived from the disk 180.

In accordance with one aspect of the present invention, two series or "layers" of flip-flop devices are provided for setting the switches in the arithmetic unit. These include a first series 200 of "conditioning" flip-flop circuits which are set, one by one, in predetermined conditions of equilibrium during one step of computation and a second series 201 set by the first series simultaneously and at the beginning of the succeeding step. The means here employed for setting the switches of the first series, one after another, may be referred to as a successive unlocking device 202 since it unlocks the flip-flop circuits in the first series so that they may be responsive to the respective conditions indicated at corresponding points on the control tape 170.

The preferred unlocking arrangement employs a delay chain 203 which includes a series of flip-flop circuits 204—215. Taking the first flip-flop device 204 as representative, it will be noted that it includes an input lead 220, an output lead 221, and an unlocking lead 222. The specific circuit corresponds to that shown in Fig. 8 previously discussed.

Prior to the beginning of a step of computation, the flip-flop device 204 receives a voltage pulse from an initiating pulse disk 223 having teeth 224 thereon which are spaced at intervals corresponding to the length of a number space. Since there are four number spaces per revolution, four teeth are used. The passage of the teeth 224 adjacent a head 225 gives rise to voltage couples which are amplified in the amplifier 226.

The flip-flop device 204 will not, however, respond to the pulse from the amplifier 226 unless it is first unlocked by applying a positive pulse to the unlocking lead 222. Let us next see how the unlocking pulses are derived for unlocking the flip-flop device 204 and the subsequent flip-flop devices in the delay chain. These unlocking pulses are obtained from an unlocking disk 230 having teeth thereon which are spaced at two-digit intervals. Each of the pickup heads 231, 232 associated therewith produces a generally sinusoidal voltage wave whenever a tooth sweeps past. The two heads are located about the periphery at such spacing that voltage pulses are generated alternately therein. Peaking amplifiers 233, 234 are connected to the respective heads.

The practical design of such amplifiers is well within the capabilities of one skilled in the art. In a preferred embodiment the amplifiers contain circuits for squaring the unpeaked voltage pulses generated in the pickup head and then differentiating these squared voltages to obtain sharp peaks. The negative peaks are then removed to leave only positive peaks spaced two digits apart. For a discussion of wave shaping circuits, see "Basic Course in Electrics," published by the U. S. Naval Institute, 1948, chapter XIX at page 207. Positive pulses are thus applied to output leads 235, 236 alternately at the beginning of alternate digit spaces. It will be noted that the output lead 235 is connected to flip-flop devices 204, 206, 208, 210, 212, 214, while the output lead 236 is connected to the intervening flip-flop devices, namely, 205, 207, 209, 211, 213 and 215.

The passage of a pulse step-by-step down the delay chain will be made clear by considering the normal operating sequence. As the first flip-flop device 204 receives an initiating pulse from disk 223, it is unlocked so that the output lead 221 thereof assumes a condition corresponding to that of the input lead 220. One digit space later the next flip-flop device 205 is unlocked allowing it to respond to the then reversed ouput voltage of the first flip-flop device 204. One digit space after that, the flip-flop device 206 is unlocked and it responds to the then existing output voltage of the flip-flop device 205 immediately ahead of it. At the same time flip-flop device 204 is unlocked. Since the tooth 224 is now past the pickup coil 225, the voltage on lead 220 will have returned to normal and flip-flop device 204 will therefore change back to its normal condition. In this way each of the flip-flop devices in the delay chain 203 produces a voltage pulse at its output which is two digit spaces in length and spaced from the pulse generated by the preceding flip-flop by a time interval of one digit space.

As stated above, the pulses, spaced in time, obtained from the delay chain are used to sequentially unlock the series of conditioning flip-flop devices 200. However, since the duration of the pulses obtained from the delay chain is too long, on the order of two digit spaces, means are provided for "narrowing down" the time interval over which the conditioning flip-flop devices are unlocked. The latter is accomplished by a series of switches 250—261.

Taking the switch 250 as representative, it includes an input lead 262, an output lead 263, and a control lead 264. The circuit of each of the switches corresponds in basic design to that previously discussed in connection with Fig. 9, except that the inherent reversal of polarity occurring in the switch may be compensated for by merely inverting the output. While it is true that each of the switches receives an input pulse a number of times during each step of computation, such pulses will only appear at the ouput when the switch is "on." The latter condition occurs only once during each step. The delay chain 203 and the associated switches thus cooperate in a novel manner to produce accurately timed pulses which are suitable for synchronization with the control tape 170.

As will later appear, it is desirable that certain switches in the arithmetic unit (Fig. 1) operate prior to the beginning of a step of computation. It is necessary therefore to advance the disk 223 slightly with respect to the shaft 27. This should be an amount sufficient so thar the output pulse from switch 250 occurs one digit space prior to a step of computation, with the output pulse from switch 251 signalizing the beginning of a step of computation. The pulse from switch 250 may be referred to as the "—1 pulse" while that from 251 is referred to as a "number pulse."

Associated with switches 253—261 are the individual conditioning flip-flop devices comprising the first series and designated 270—278 respectively. All of the latter, it will be noted, are simultaneously energized on the input side by a line 279 coming from the pickup head 174 of the control tape. They cannot, however, all respond simultaneously to the voltage impulses on the line 279 since they are unlocked only one at a time. Each of the devices 270—278 may be considered to have a control space reserved for it on the tape 170, the tape being so phased that such space passes the head 174 just as the corresponding flip-flop device is unlocked. Since the synchronizing elements are mechanically coupled, a high order of accuracy may be achieved. By the end of one step of computation each of the flip-flop devices in the first series, or layer 200, has been energized by the control tape to assume the condition suitable for the next step. As a result the proper combination of voltages is caused to exist on the output leads 280—288 which interconnect the two layers 200, 201.

The flip-flop devices which are in actual control of the switches are designated 291—298 and have specific circuits similar to that shown in Fig. 8. These do not change their condition immediately upon a change of condition in the leads 281—288 which supply them, but require unlocking. In practicing the invention, the switch controlling flip-flops are unlocked simultaneously at the very beginning of a step of computation. They are then free to respond to the associated conditioning flip-flop devices, such response taking place instantaneously to cause the immediate setting in the switches of the arithmetic unit. It may be noted at this point that the flip-flop device 291, and 270 as well, differ from the circuit of Fig. 8 only in that a second output lead is provided from the plate terminal of the left hand tube 135.

Consideration may next be given to the means employed for simultaneously unlocking all of the flip-flop devices in the second layer 201. It will be observed in Fig. 2 that the switch 251 which is unlocked by the flip-flop device 205 feeds into a lead 299 which is connected to the unlocking leads of all of the flip-flop devices in the second or output layer. As a result of the simultaneous unlocking, it will be apparent that the switches in Fig. 1, having control terminals $b$, $c$, $d$, $e$, $f$, $g$, $h$, $i$, $j$, will be open circuited or short circuited in a predetermined manner to meet the needs of the ensuing computation step.

The components thus far described are capable of setting the switches in the arithmetic unit at the beginning of a step of computation. There are certain switches required for low order digit insertion which must be operated one digit space in advance. To this end a pulsing disk 310 is used having four teeth 311 which sweep adjacent a head 312. The voltage induced therein is amplified in an amplifier 313, and applied to an output lead 314, which leads to flip-flop device 315. The latter has output terminals $p$, $q$ which are connected to correspondingly lettered terminals in the arithmetic unit of Fig. 1.

With the disk 310 properly advanced in the direction of rotation, the pulses appearing on the lead 314 may be made substantially one digit space early. Means are additionally provided, however, for increasing the timing accuracy of the voltages applied to the terminals $p$, $q$ when the condition of equilibrium of the flip-flop device 315 is reversed and then restored to its original condition precisely one digit space later. This is accomplished by connecting the unlocking lead 307 of the flip-flop device to two sources of pulses, spaced one digit space apart and timed by the same pulsing disks 223, 230 which control the remainder of the computer. In the present instance the unlocking lead 307 is supplied from lead 263 via an amplifier 308 and from lead 299 via an amplifier 309.

In operation a pulse approximately one digit space in length is supplied to the device 315 from the disk 310 slightly more than one digit space prior to the start of a step of computation. The device 315 is unlocked exactly one digit space prior to the start of a step of computation. This causes it to "flip" into its alternate condition in which it remains temporarily even though the voltage on the input lead 314 reverts to its former value. One digit space later another unlocking pulse causes the device to "flop" back to its former state.

In similar fashion, it is desirable to produce special pulses at the beginning of a step of computation and exactly one digit space later for what will be referred to as high order digit insertion. This is accomplished in the present instance by disk 320 having four teeth 321, and associated pickup head 322. The output of the amplifier 323 is fed into a lead 324 which is connected to the input of a flip-flop device 325 having output leads 326. This flip-flop device 325 is unlocked at the beginning of a number space by a signal from unlocking lead 304 via an amplifier 305 causing predetermined voltages to appear on terminals $n$, $o$. One digit space later it is restored to its original condition by an unlocking pulse applied to lead 304 by an amplifier 306.

As will later appear, it is necessary to unlock flip-flop device 132 (Fig. 1) at the last digit of a number space in order to determine whether the ensuing step is to be addition or subtraction. Such unlocking is accomplished by the disk 330 having four teeth 331 thereon. Voltage induced in a head 332 is amplified by amplifier 333 and fed into a lead 334 connected to the terminal $r$. More will be said of the function of the pulse appearing at terminal $r$ in the example to follow.

The remaining disk in Fig. 2 is employed to unlock the delay chain 141 included in the summing circuit 100. This disk is designated 340 and includes a plurality of closely spaced teeth 341, one per digit space. Cooperating with the teeth is a head 342 feeding into an amplifier 343 having both direct and inverted output leads 344, 345 respectively. These output leads are connected to the terminals designated $s$, $t$. The amplifier 343 preferably includes a saturable reactor for peaking purposes and may be substantially identical to the "dual pulse generator" disclosed in Fig. 4 of my co-pending application Serial No. 34,986 above-mentioned.

The only portion of the circuit of Fig. 2 which has not been thus far referred to is that portion including switches 346, 347 feeding into the flip-flop device 291. It will be noted that the flip-flop device 291 which is connected to output terminals *i, j* determines whether the summing circuit will add or subtract. For reasons which will later appear, it is desirable that the determination of addition or subtraction be initially under the control of the control tape and in subsequent steps under the control of the arithmetic unit of Fig. 1. The reason for this is that the process of division includes invariably an initial step of subtraction, while later steps may be either addition or subtraction, depending upon whether the high order digit in successively produced remainders is a 1 or a 0. With the switches connected as shown it will be apparent that closure of switch 346 enables setting of the flip-flop device 291 from the control tape just as in the case of devices 292—298 while closure of switch 347 causes device 291 to be set in accordance with instructions received from terminal *m* of the arithmetic unit.

Prior to taking up an actual example, it will be helpful to summarize the wave forms as they exist on the various significant leads throughout the control unit of Fig. 2. The wave shape, as well as the synchronous relationship between the various waves is set forth in Fig. 11. Each trace therein may be identified by a numeral corresponding to the numbered lead in Fig. 2 to which it applies.

SHIFTING OF NUMBER RELATIVE TO BINAL POINT

It will be perceived from the foregoing and particularly the above-outlined "Process of Division" that the computer is called upon to perform additions and subtractions of binary numbers, the shifting of a binary number relative to its binal point, and the recording or tallying of whether an addition or subtraction has been performed, the tally becoming the uncorrected quotient. Prior to going through a sample calculation in detail in order to see how such process is performed in a practical case, it will be well to discuss in greater detail the manner in which binary numbers are shifted either to the right or to the left. To this end, reference is made to Figs. 12, 12*a* and 12*b* which illustrate the reading of a binary number from one disk and the recording of such number on a successive quadrant on another disk.

Fig. 12 illustrates the transference of a binary number from disk 21 to disk 71 without shift. The quadrants have been arbitrarily numbered and revolution of the disk is assumed to be taking place in a clockwise direction. On disk 21, the 12-digit number carried by the disk in quadrant 1 is indicated at its periphery. The intelligence is actually carried on the disk in the form of magnetic couples, a north-south couple being indicative of a binary 0. The pickup head 31 converts the variations in magnetism into variations in voltage which are applied via a switch 56 to the recording head 78 on disk 71. This recording head is shifted neither to the right nor to the left and consequently the binary number read from quadrant 1 of disk 21 is recorded unchanged on quadrant 1 of disk 71. The number to be recorded is shown dotted in the position it will assume as the disks rotate.

Next, reference is made to Fig. 12*a* which sets forth a transfer of a binary number from disk 71 to disk 74. This differs from the situation shown in Fig. 12 in that the recording head 75 on disk 74 is displaced or offset one place to the left. Consequently, the binary number recorded on quadrant 2 of disk 74 will be shifted one place to the left. The result of such shift is shown by the dotted numbers on disk 74. One would expect under these conditions that the first digit space in quadrant 2 (disk 74) would either be blank or would carry the highest order digit left over from the recording of a 12-digit number in quadrant 1. Either of the latter conditions is undesirable and consequently, means are provided in the present computer for automatically and repetitively recording in the first digit space of each of the quadrants a binary 0. With such a 0 properly added to the first digit space of quadrant 2, the complete binary number recorded thereon differs from that which was read from disk 71 merely by being shifted one place to the left. It will be understood that this is the same as multiplying a number by a factor of 2. The added 0 may be termed a "fill-in."

Attention may be given at this point to the means which have been employed for automatically recording a binary 0 in the first digit space in each of the quadrants on disk 74. The zero generating disk 90 serves as a source of binary 0's. In order to record a zero in the lowest order it is necessary that a zero signal be applied to the head 75 one digit before the beginning of a step of computation. To this end switches 112 and 113 are arranged in series and connected to the zero supply line 92. Switches 113 and 114, it will be noted, are actuated by terminals *p* and *q* of the control unit (Fig. 2). Thus switch 113 is turned on only during the "—1" digit space and switch 114 is turned off only during the "—1" digit space. This action is repeated for the first digit space of each of the four quadrants and binary 0's have been entered in all of the quadrants (Fig. 12*a*) for purposes of illustration.

Fig. 12*b* illustrates an analogous situation except that the shift of the binary number as it flows from one disk to another is to the right rather than to the left. A 12-digit binary number is shown recorded in quadrant 1 of disk 74. The recording head 81 on disk 80 is shifted or offset one digit space to the right. This produces the desired effect, namely, shift of the binary number recorded in quadrant 2 one space to the right which is equivalent to dividing the number by 2. It is undesirable, however, to record the low order digit of the shifted number in the highest order of quadrant 1 since it is essential that such digit be completely discarded. Accordingly, means are provided for always recording a binary 0 in the highest order digit space of each of the quadrants. In the present device this is accomplished by turning on switch 121 during the first digit space in each step, switch 121 being under the control of terminal *n* of the control unit (Fig. 2). This causes a binary 0 to flow from the zero generating disk 90 into the recording head 81. Since this occurs at each step in the computation, binary 0's are shown entered in all four of the quadrants of disk 80 in Fig. 12*b*.

DATA FLOW DIAGRAM

The present invention involves more than the presence and interconnection of certain electrical and mechanical components. In certain aspects it resides in the manner or method in which such components are utilized to effect data flow for the solution of a problem and particularly a problem in division. The latter in turn depends upon the arrangement of intelligence recorded on the control tape to produce a given sequence of mathematical operations. While it would be possible to show a length of control tape with the order and spacing of control data thereon required to produce a given sequence of operations in the arithmetic unit, interpretation would be extremely laborious. Instead, a data flow diagram has been prepared which is included herewith as Figs. 13, 13*a*, 13*b*, and 13*c*. This diagram shows not only the active data paths in each step of the process, but also the actual numerical value of the binary numbers as they are read from and recorded on the various rotating disks.

Across the top of the diagram are listed the various disks 21, 71, 74 and 80 between which data flow takes place. The zero generating disk 90 is not shown with the other disks since it merely serves as a constant source of binary 0's (or, upon inversion, of binary 1's). The successive steps are listed along the left-hand edge of the diagram. At the beginning of each step the number is read from a disk and by the time the step has been completed, a number has been recorded elsewhere either as a simple transfer or after suitable transformation. Such transformations include shifting to the right or to the left, addition of two binary numbers or subtraction of one binary number from another. The time consumed in each of the steps is the same and has been previously referred to as a "number space." Since four binary numbers appear about the periphery of each of the data disks, one per quadrant, a number space is equal in point of time to the interval required for the shaft 27 to rotate through one-quarter of a revolution. It will be understood, of course, that additional binary numbers could be arranged about the periphery; however, four has been found practical and is, therefore, suitable for illustration. Each of the four quadrants will have allotted a certain number of digit spaces, depending upon the desired capacity of the machine. In the present example there are 12 digit spaces per number space.

It will be assumed that the divisor and dividend initially occupy the first two quadrants on the storage disk 21, the divisor in the present example being 000000000101, while the dividend is 000000001111. These numbers have been previously recorded on the disk (in the form of magnetic spots or couples) by any desired means, for example, as a result of a calculation previously performed.

It is not possible to start the process of division immediately. Two preliminary matters must be taken care of. In the first place, the numbers must be adjusted relative to one another by shifting to the right or left so that the divisor is larger than the dividend. In using the present method it is preferred that the divisor be larger than the dividend but by no more than a factor of 2 (one binal place). In the operation to be described such shifting will be under the control of the control tape as a result of information previously recorded thereon by an operator. If desired, initial shifting or adjustment might be effected automatically in the computer and a tally kept of the number of binal places of net shift in the quotient. Preliminary shifting which is completely automatic has, however, not been included within the present application in order to simplify things as much as possible.

The second function of the computer preparatory to the solution of a division problem is the transference of the binary numbers to appropriate disks and quadrants thereon so as to permit them to be conveniently available. In this connection, it is important to remember that each time a number is recorded on and read off of disk 74 there will be an effective shift of the number to the left causing multiplication by 2. Similarly, each time a number is recorded on and read off of disk 80 there will be a shift to the right which is equivalent to division by 2. Thus, in the preliminary transference or jockeying of the numbers to get them into favorable positions for the start of computation, it will be necessary to compensate for the shifts to the left or right incident to the use of disks 74 and 80.

A third type of adjustment may be necessary in the solution of certain problems, although it is involved to only a limited extent in the example to be described. In order to obtain maximum accuracy, it is desirable to have the significant digits as far to the left as possible. This broad principle is, however, subject to reservations. In the first place, it is not desirable to extend the significant digits all the way to the left since the left-hand or highest order digit is reserved to indicate whether the number is plus or minus. When the number is plus, the left-hand digit will be binary 0, while when the number is minus, the complement of the number is used making the extreme left-hand digit a binary 1. As will later appear, the sign of a remainder is important in determining the nature of the succeeding operation.

As a second reservation in shifting the significant digits to the left, it is necessary to take into account all numbers which are likely to be supplied as divisor and dividend. Since the same control program will be applied normally to each set of dividend and divisor, the leftward shift of the significant digits will normally be determined by the largest binary numbers to be encountered. In the example which follows the divisor is moved to the left three places while the dividend is moved only one place, making a net shift of two places. Stated in other words, the quotient will be smaller by a factor of binary 100 than it should be requiring a corresponding correction when the computation is completed.

Figure 13:
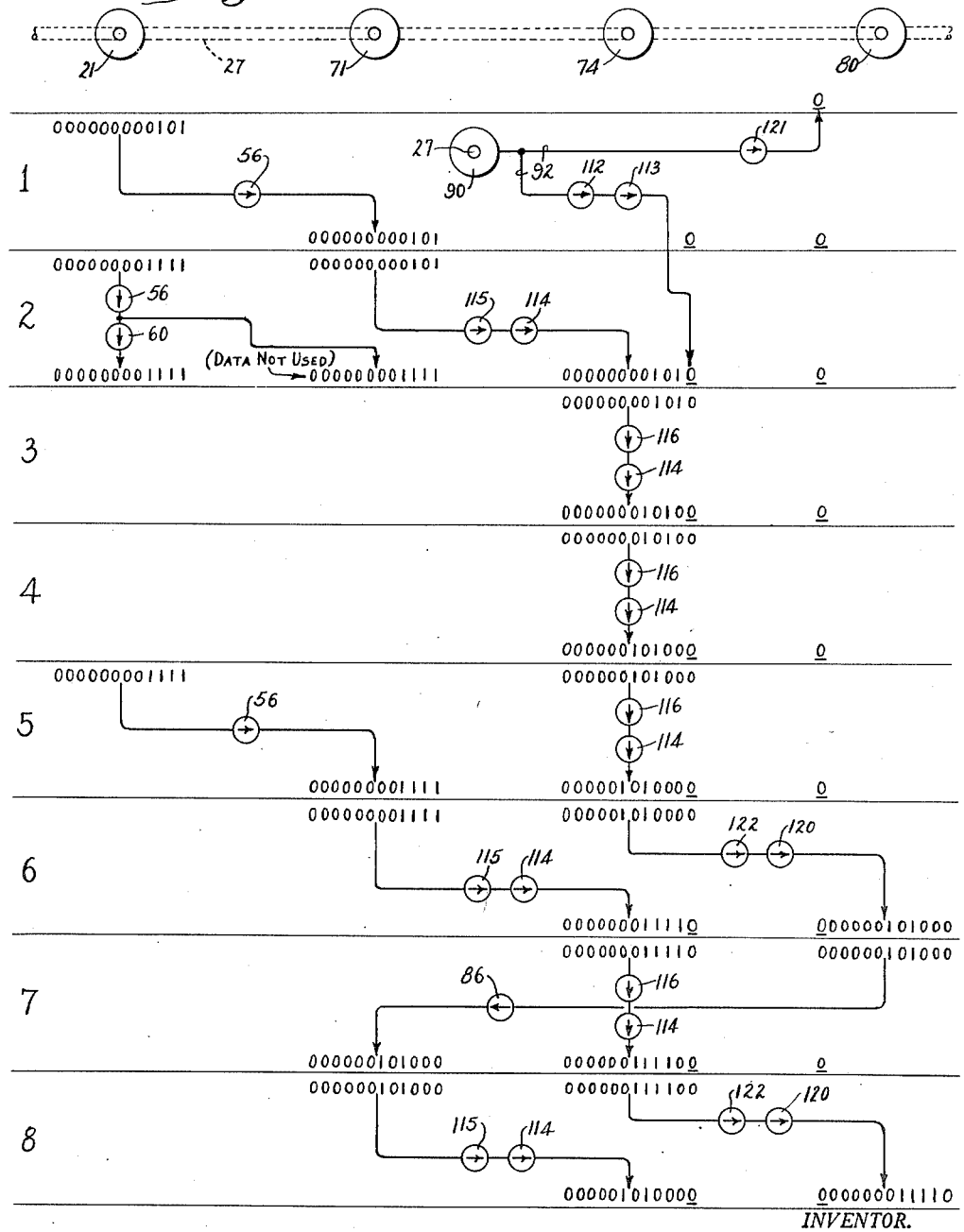

Referring now to Fig. 13, each step of a sample calculation will be separately discussed.

Prior to Step 1 the control tape is advanced, causing each of the flip-flop devices 270—278 (Fig. 2) to be "conditioned" in anticipation. Then, at the beginning of Step 1 all of the switch-controlling flip-flops 291—298 and the switches connected thereto will be operated simultaneously to set up the desired data flow paths. Throughout the steps which follow it will be understood that the control tape is always active one step ahead, with the flip-flop devices 270—278 serving as a temporary storage means for the control data.

Step 1

In this step the divisor 000000000101 is read from the first quadrant of disk 21 and, digit by digit, recorded on the first quadrant of disk 71. This operation requires closure of switch 56 which is effected through terminal *d* in the control unit as directed by the control tape. Fig. 12 shows a number recorded on disk 21 about to be read therefrom. The position which the number will occupy on disk 71 at the end of the step is shown dotted. During this step switch 112 is closed and switch 113 in series therewith is closed to pass only the last digit of the number. Since the head 75 is offset to the left this causes a binary 0 to be recorded in the first digit space in quadrant 2 of disk 74. The latter is required in the lowest order for fill-in purposes as discussed in connection with Fig. 12a. In an analogous fashion switch 121 is closed to pass only the first digit of the number. However, since the head 81 on the disk 80 is offset to the right the digit is entered in the last digit space of the previous quadrant. This explains the upwardly directed arrow at the right-hand edge of the drawing (Fig. 13) in Step 1. This produces the fill-in or insertion of a digit the necessity of which was described in connection with Fig. 12b. The filling in of binary 0's at the beginning of each quadrant on disk 74 and at the end of each quadrant on disk 80 is normally repeated during each step of the computation. Since the function is repetitive, it is not necessary to complicate the data flow diagram by separate showing of the insertion paths in each step.

The reason for reading the divisor out of the storage disk 21 first is that it must, after shifting, end up on the dividing disk 80 at the same time the shifted dividend reaches disk 71, and this can be accomplished in the least number of steps by shifting the divisor first.

Step 2

Next the divisor is read from disk 71, passing through switches 115, 114 and is recorded on disk 74. This causes a shift of the number to the left one binary place. Fig. 12a shows the condition at the beginning of Step 2. The number which will be recorded on disk 74 by the end of such step is shown dotted thereon. In order to make the dividend available on disk 21 at the most opportune time, it is read off and recorded back on disk 21 thus advancing one quadrant.

The underlined zero shown recorded on disk 74 was actually recorded during the last digit space of Step 1. However, due to the shift of the recording coil 75, it is recorded as the low order digit in quadrant 2 and, therefore, is shown in Step 2. Throughout the data flow diagram underlining will be used to indicate that the digit is a "fill-in", either from the zero generating disk 90 or the last digit out of the summing circuit. This latter type of fill-in will be discussed in more detail in connection with some of the succeeding steps.

Step 3

The divisor is read from the multiplying disk 74 and simultaneously re-recorded thereon in the succeeding quadrant. This produces a second shift to the left of the divisor relative to its binal point.

Step 4

This is a repetition of Step 3 in which the divisor is again shifted to the left making a total shift of three binal places.

Step 5

The dividend is read from disk 21 and recorded unchanged on disk 71. The divisor is again read from disk 74 and re-recorded thereon. This makes a total shift of four binal places to the left for the divisor. It is desired to shift the divisor to the left only three places, assuming that the dividend is shifted one place. However, since the divisor will subsequently pass through the dividing disk 80 which will shift it to the right, it is necessary that it be shifted to the left an additional time on disk 74 to compensate.

Step 6

Here the dividend is read from disk 71 and recorded on disk 74 causing a one place shift to the left. Simultaneously, the divisor is read off of disk 74 and recorded on disk 80 causing it to shift one place to the right. This is shown in detail in Fig. 12b. The dividend was moved in position on disk 21 in Step 2 so that it would be available in Step 5. Thus, it reaches disk 74 just as the divisor is being read out of disk 74. If it had not been moved in Step 2, it would not have been available again until Step 6. The only disadvantage of not moving the dividend in Step 2 would be the necessity for an additional step.

*Step 7*

The divisor is read from disk 80, passes through switch 86 and is recorded on disk 71. The dividend is read from disk 74 and re-recorded thereon to shift it one more place to the left.

*Step 8*

The divisor is read from disk 71 and recorded on disk 74 shifted one place to the left. The dividend is simultaneously read from disk 74 and recorded on disk 80 with a one place shift to the right.

*Step 9*

This is the final step in the preliminary series. The divisor is read from disk 74 and recorded on disk 80 causing a one place shift to the right, and the dividend is read from disk 80 passes through switch 86 and is recorded on disk 71. The divisor is now back where it was in Step 6. The only reason it was circulated through disks 71 and 74 was to clear disk 80 so that the dividend could be passed through from disk 74 to disk 71.

To summarize, the reason for the above transformation is to shift the dividend one place to the left causing it to appear on disk 71 and to shift the divisor three places to the left causing it to be positioned on disk 80. We are now ready to begin the actual process of division. In these steps $x$'s will be used to denote any digit spaces which do not carry useful intelligence at the moment but which are usefully employed in subsequent steps.

*Step 10*

It will be recalled in discussing the "Process of Division" above that the first step is to subtract the divisor from the dividend. This is accomplished by feeding the dividend through the left-hand input lead 101 of the summing circuit and by feeding the divisor, in inverted form, through the right-hand lead 102 of the summing circuit. This is readily accomplished by setting up the control tape to order closure of switches 110 and 125. The difference between the dividend and divisor appears on the summing circuit output lead 103. Switch 131 is turned on so that the difference is recorded on disk 71.

Since this subtraction constitutes the first step in the actual division process, two additional things must be done in order to satisfy the rules of the process previously set up. In the first place, we must condition the computer so that the divisor, properly shifted to the right one place, is added to the negative remainder and not subtracted from it. The reason for this is that we are striving constantly in the process to reduce the magnitude of the remainder to 0. This is accomplished by unlocking the flip-flop device 132 at the exact instant that the last digit appears on the summing circuit output lead 103. Such unlocking is effected by a positive pulse on lead 134 which is supplied from terminal $r$ associated with the disk 330 (see Fig. 2). The output of the flip-flop 132 thus indicates to the terminal $m$ that the remainder was negative. This information is passed through switch 347 and operates the flip-flop device 291 controlling the terminals $i, j$. The effect of this is to turn the switch 124 on and the switch 125 off so that the divisor (shifted) and not its inversion is supplied from disk 80 to the summing circuit input lead 102 in the succeeding step.

Since the remainder is negative requiring the following step to be one of addition rather than subtraction, the computer, in accordance with the process of division previously referred to, is in a position to write the first digit of the uncorrected quotient. As here used the word "write" means to record magnetically. It has previously been stated that when the remainder is negative the subsequent step is one of addition, and a binary 0 should be written. This is readily accomplished since the digit to be written is always the inversion of the left-hand or high order digit of the remainder. It is sufficient, therefore, to cause the tape at this point to close switch 111 and open switch 112 whereupon the high order digit, inverted by the inverter 130, is recorded on disk 74. Only the high order digit is recorded because switch 113 is on only for that digit, as previously explained.

It is important to note at this point that the high order digit (1) of the remainder, inverted and recorded as the first digit (0) of the quotient is, strictly speaking, the second digit of the quotient. The real first digit would be always a binary 1 corresponding to the initial subtraction of divisor from dividend. Such subtraction is, however, purposely not tallied since the binary 1, which would serve as the tally, forms no useful part of the final quotient. On the contrary such initial binary 1 is automatically dropped, this automatic dropping constituting one of the secondary but nevertheless important features of the present invention.

In this step also the divisor is recorded back on disk 80 through switches 123, 120 so that it will be available for the next step and will be shifted one place to the right.

Thus far in Step 10 nothing has been said about the operation of the summing circuit 100 except that the output shall be the true difference (or sum as the case may be) of the binary numbers fed into the input terminals 101, 102. To accomplish this, however, a precaution must be taken, as covered in detail in the above-mentioned co-pending application. Where a sum is to be taken, the first "carry" digit should be a binary 0 in order to insure that a "carry 1" is not left over from a previous summation. Conversely, when a difference is to be taken, as in the present step, the first carry digit should invariably be a binary 1. This 1 is obtained from the zero generating disk 90 after inversion through lead 93 and switch 127. It is of interest to note that the low order digit inversion is taken care of automatically in the present arrangement since the switches 125, 127 are turned on simultaneously being connected to the same control terminal $j$. Likewise, switches 124, 126, used for simple addition, are turned on simultaneously under the control of terminal $i$. It is absolutely impossible for the two sets of switches to be both turned on since the terminals $i, j$ are supplied from the output of the same flip-flop device 291. Since the insertion of the carry digit (0 or 1) in the lowest order takes place automatically in the summing circuit, it will not be necessary to again refer to it in the discussion of the subsequent steps.

In the present process of division, the first step is invariably one of subtraction of the divisor from the dividend. Since this is the same regardless of the specific problem such subtraction may conveniently be directed by the control tape. Accordingly, prior to this first step switch 347 (Fig. 2) is turned off and switch 346 is closed. Consequently, the flip-flop device 291 which controls terminal $j$ is connected to the flip-flop device 271 which receives its orders from the control tape. Energization of the terminal $j$ insures that the complement of the divisor and not the divisor itself is applied to the input lead 102 of the summing circuit. In all subsequent steps in the solution of a division problem, the addition or subtraction of the appropriately shifted divisor is determined by what has gone before. Accordingly, during this first step and all subsequent steps of the actual division process, the switch 346 is open circuited and the switch 347 is closed. Switches 346 and 347 are operated directly from flip-flop 270 which lies in the first "layer" and therefore they do not have to wait until the start of the succeeding number space to be operated. Consequently at the start of the succeeding number space, flip-flop 291 (which selects addition or subtraction is set in accordance with the voltage existing at terminal $m$ at that instant). It will be recalled that this voltage is the output of flip-flop 132 which is set at the time that a high order digit appears at the output of the summing circuit.

*Step 11*

This step is identical in principle with Step 10. The only difference is that the switches 124, 126 are closed to cause addition of the divisor as directed by the preceding step. The negative remainder from the preceding step is read off of disk 71 and fed into the input lead 101 of the summing circuit. In synchronism therewith, the shifted divisor is read off of disk 80 and, without inversion, is fed into the input lead 102 of the summing circuit. The positive remainder is then recorded on disk 71. Since the remainder is positive, the high order digit being a 0, a voltage appears at terminal $m$ (Fig. 1) which, via switch 347, causes flip-flop device 291 to operate. This produces a voltage at terminals $i$, $j$ which directs switches 125, 127 to close, causing the next step to be one of subtraction. At the same time, the left-hand digit of the remainder (a binary 0) appearing at the output 103 of the summing circuit causes a binary 1 to be written on disk 74.

*Step 12*

This step is the same in general principle to Steps 10 and 11. The 0 in the high order digit space on lead 103 in Step 11 turns switches 125 and 127 on for subtraction. One additional function is introduced in this step: namely, the binary 0 recorded as a digit of the uncorrected quotient in Step 10 is read off of disk 74 and re-recorded immediately following the recording of the binary 1 recorded as the second digit of the uncorrected quotient in Step 11. Thus, as additional digits of the quotient are produced, all the previous digits are re-recorded, shifted one place to the left relative to a number space, automatically making room for the new digit.

*Steps 13 to 21 inclusive*

These steps are the same in general principle to Steps 10, 11 and 12 which have just been discussed. In each step, a negative remainder directs that the shifted divisor shall be added in the subsequent step and further directs that a binary 0 be recorded as the next digit of the quotient. Conversely, a positive remainder directs subtraction of the divisor and the recording of a binary 1 as the next digit of the quotient. This process is repeated as many times as there are digits in the number space. Since in the present device there are twelve digits in the number space, the adding and subtracting is carried through twelve cycles, namely, from Steps 10 through 21 inclusive. At the end of Step 21, the uncorrected quotient appears as $x01100000000$ on disk 74 with the final or lowest order 0 (and which has been obtained in Step 21) appearing in the lowest order of the quadrant to the left.

Steps 18 through 22 are shown in shortened form since the data flow paths are the same as in Step 17.

*Step 22*

This is the final step in obtaining the uncorrected quotient, namely, putting all of the digits in proper order in one quadrant. This merely involves an additional reading and re-recording of the quotient on disk 74. This is done by turning off those switches which were used in the preceding steps with the exception of switches 116, and 114, the number $x01100000000$ being re-recorded on disk 74 alongside of the binary 0 obtained as the lowest order digit of the quotient in Step 21. This produces the complete (but uncorrected) quotient 011000000000.

The only remaining problem prior to utilizing the answer or quotient is proper placement of the binal point. Prior to locating the binal point it is important to remember that the first step in the division process is always subtraction, namely the subtraction of the divisor from the dividend. According to the process previously outlined, the first digit recorded in the quotient should have been a binary 1 as a tally of the subtraction step followed by a binary 0 to tally the subsequent addition step. However, since these two initial steps are invariably the same there would always be a 1.0 as the first two digits of the quotient, the full quotient reading 1.011000000000. The computer in its present embodiments omits the actual recording of the initial binary 1. As a result it is possible as a first correction to move the binal point one place to the right to produce what may be termed a semi-corrected quotient namely, 0.11000000000. To make the final correction it will be recalled that the divisor was moved three places to the left while the dividend was moved one place to the left in preliminary Steps 1 to 9 prior to actual division. This amounts to a net shift of the binal point two places to the left. The operator of the machine conveniently keeps track of such shift when making up the control tape 170. To compensate, the binary point is properly placed in the quotient by moving it two additional places to the right, giving a corrected quotient of 11.000000000. Since the example chosen has purposely been kept very simple, this result may be easily verified by conventional binary long division.

One benefit of not recording the initial binary 1 is that the quotient may be carried to an additional place of accuracy. If desired, however, and without departing from the invention, it is obvious that such initial binary 1 could be recorded as part of the quotient merely by recording a 1 instead of a zero on disk 74 in Step 9 by any desired means. This could be done, for example, by including an inverting device similar to 130 in series with switches 112, 113 and under the control of the tape 170. The process of division would then be halted at the end of Step 21 instead of Step 22. Correction under such circumstances includes moving the binal point one place to the right and subtracting 10. The latter may be conveniently thought of as multiplication by two and subtracting two as will be made apparent in the section entitled "Mathematical Verification" to follow.

Or, if desired, the actual process of division as exemplified by the Steps 10 to 21 inclusive could be extended by one step to produce a quotient in the final step of .110000000000. The quotient under such circumstances may be said to be corrected automatically relative to the binal point and requires no additional correction other than that made necessary by the original 2-place adjustment of divisor and dividend. The important thing is that the procedure outlined herein produces significant digits of the quotient on disk 74. The subsequent and proper placement of the binal point therein is for the most part straightforward and will normally be held in abeyance in the solution of a more complex problem involving a number of additional operations.

Of course it is necessary that the quotient appearing on disk 74 be so positioned on the disk as to enable the number to be coordinated with other numbers, particularly for subsequent additions and subtractions. This may in some instances require the quotient to be shifted to the left or, more likely, to the right. Additional shift to the left may be accomplished by any desired means, for example, by reading the number and re-recording it on disk 74 via switches 116, 114 the desired number of times. Shift to the right may be accomplished in a completely analogous manner by reading the number from disk 74 and recording it on disk 80 via switch 122, 120.

ALTERNATIVE ARITHMETIC UNIT

It will be appreciated by one skilled in the art that the invention is not necessarily limited to the specific circuit disclosed in Fig. 1, but as applicable to and includes alternative circuits operating in the same general manner to produce the same beneficial result. One such alternative is disclosed in Fig. 3. It employs the same "process of division" described in a previous section; the primary difference between this circuit and that previously described is that the remainder is shfited one place to the left each step instead of the divisor being shifted one place to the right.

The circuit arrangement is somewhat different in that all of the disks feed either directly or through the summing circuit onto a main trunk line. This has the advantage that a binary number can be multiplied by two (shifted to the left) or divided by two (shifted to the right) without having to be passed through a series of disks as was the case with Fig. 1. For example, to multiply the dividend by two with the circuit of Fig. 1, it was necessary to transfer the number from the memory unit 20 to the disk 71. From the disk 71 it had to be moved to a disk 74 where the multiplication took place. In order for the number to get back to the memory unit, it had to be passed through the dividing disk 80. This required that the number be first circulated once on the disk 74 to compensate for passage through the disk 80. Thus, to read a number out of storage, multiply it by two, and place it back into the storage unit in Fig. 1, requires five number spaces or 1¼ revolutions of the shaft 27. The same procedure, by way of contrast, may be carried out in the circuit of Fig. 3 in only three number spaces or ¼ revolution of the shaft. Prior to observing the manner in which the circuit operates, it will be helpful to refer briefly to the electrical and mechanical components contained therein.

The main drive shaft indicated at 360 is rotated at high speed by a motor 361 to drive the disks 362, 363, 364, 365, and 366. It will be noted that all of the disks with the exception of the zero generating disk 366 are arranged so as to receive information from a main trunk line 367. This is accomplished through switches 370, 371, 372, and 373.

The disk 362 includes a head 380 offset one digit space to the right enabling division by two. Disks 363 and 365 include heads 381 and 382 respectively which are offset one space to the left, resulting in multiplication by two. Binary numbers may, however, be passed through the disk 364 without shifting.

Continuing with the description of Fig. 3, the disk 362 feeds into the main trunk 367 via a pickup amplifier 383 and a switch 384. The pickup amplifier 383 corresponds to that disclosed in Fig. 6, including a pulsed lead $s'$ which insures a synchronized square wave output. The output of the multiplying disk 363 is fed into the input of a summing circuit 385 via a pickup amplifier 386 and a switch 387. The pickup amplifier 386, as in the case of amplifier 383 and the remainder of the pickup amplifiers to be discussed, is pulsed to produce a synchronized square wave form. Binary 0's may be supplied to either of the disks 362, 363 through a lead 390 and via switches 391, 392 respectively.

Turning attention now to the next disk 364, it will be seen that it includes at its output a pickup amplifier 395 having direct and inverted output leads 396, 397 respectively connected to output switches 398, 399. The latter feed into the second of the two input leads of the summing circuit 385. Provision is made for recording an output signal from the disk 364 back on the disk in a successive quadrant. This is accomplished by a lead 400 fed by the output of the amplifier and a switch 401 in series therewith.

Moving on to the next disk 365, there will be noted a pickup amplifier 406 in series with a switch 408 feeding into the input of the disk. A switch 407 enables the amplified signal from disk 365 to be applied to the main trunk line 367. An inverter 409 is in series with the input switch 373 to permit the recording of inverted signals from the main trunk line 367.

The zero generating disk 366 feeds into a pickup amplifier 414 which has direct and inverted output leads 415, 416 respectively connected to output switches 417, 418. As in the case of Fig. 1, a lead 419 is provided for feeding binary 0's or 1's into the summing circuit. An additional switch 420 connected to the zero generating output line 415 permits the flow of binary 0's to the main trunk line 367.

A memory unit (corresponding to the memory unit 20 of Fig. 1) has not been shown. It will be understood that the main trunk line 367 may be supplied with binary numbers constituting a problem of division by any desired means. Normally, a plurality of memory units 20 will be employed so that problem data may be taken from several sources all, of course, under the control of the control tape.

The remainder of the circuit of Fig. 3 is the same as that of Fig. 1. A pair of leads 424, 425 supply control voltages to the summing circuit for low order digit insertion while lines 426, 427 supply pulses to the carry delay chain. In the output of the summing circuit, a switch 430 enables the output signal to be fed to the main trunk line 367 while a flip-flop device 431, under the control of a pulse lead 432, supplies information via a line 433 to the control unit next to be described.

ALTERNATIVE CONTROL UNIT

While it would be possible to understand the operation of Fig. 3 by means of a data flow diagram and without reference to the specific control unit employed, nevertheless it will be helpful to inspect the alternative control unit (Fig. 4) very briefly. This control unit, aside from being tailored to the needs of the alternative arithmetic unit, differs in mode of operation. True, it has a first layer of flip-flop devices 440, and a second layer of flip-flop devices 441. It does not, however, include a delay chain for admitting intelligence to the flip-flop devices of the first layer in sequence. On the contrary, the shaft 360 carries a series of disks 443 to 453 each having four teeth thereon spaced about the periphery. The teeth of each disk are offset slightly relative to the teeth on the remainder of the disks so that the flip-flop devices associated therewith are unlocked at the proper instant to receive their orders from the control tape. The control tape, "B" clutch, and associated components are the same as previously described in connection with Fig. 2 and corresponding reference numerals have been applied.

Referring more specifically to Fig. 4, it will be seen that the disks 446—453 acting through appropriate peaking amplifiers respectively trigger flip-flop devices 456—463. These constitute the "first layer" 440, and are set up by the control tape 170 in the number space prior to that in which the orders are utilized. (The one exception to this is that the setting of flip-flop 456 is utilized immediately to set switches 480 and 481). Corresponding flip-flop devices in the second layer are designated 467—473. These are triggered in unison by a disk 444 through line 475 at the very beginning of a number space. As in the case of Fig. 2, the flip-flop device 467 is arranged to be controlled from the control tape via a switch 480 at the start of the division process, but is under the control of the arithmetic unit by means of a switch 481 during subsequent steps. Information from the arithmetic unit is fed into the control unit through terminal $m'$.

The drive shaft 360 also carried a series of four disks 310, 320, 330, and 340 which correspond to similarly numbered disks in Fig. 2. The disks 310, 320 feed into flip-flop units 315, 325 having correspondingly lettered output terminals. These are controlled by pulses received from amplifiers 317, 327.

Prior to discussing the operation of the alternative arithmetic and control units, it will be helpful to observe that the disc 443 produces a pulse on its output lead one digit space ahead of the start of a number space. This may be referred to as the −1 pulse. One digit space later, the projection on the disk 444 passes under its pickup coil and produces a number pulse on the lead 475 for setting up all of the switches for the ensuing step of computation. The disk 445 produces a pulse on its output lead one digit space after this. The remainder of disks 446—453 in the series produce unlocking impulses in timed succession. It will be apparent to one skilled in the art that the series of disks 445—453 could be expanded beyond 9 up to and including the number of digits per number space for which the calculator has been designed.

DATA FLOW DIAGRAM FOR ALTERNATE CIRCUIT

The operation of the circuits shown in Figs. 3 and 4 will be understood by reference to the flow diagram set forth in Figs. 14, 14a, 14b. Disc 362 is not required in the exemplary computation and is included for purposes of flexibility. It enables shift of a number in either direction.

Step 1

In the present embodiment, only six steps are required to adjust the divisor and dividend for the process of division rather than nine steps as in the previous embodiment. Here too it is necessary to adjust the binal point so that the divisor is changed from 000000000101 to 000000101000 and the dividend from 000000001111 to 000000011110.

Just as in the embodiment discussed, the recording heads are offset on discs 362, 363, 365 effecting a one place shift of the recorded number. In the case of the shift to the left, it is thus necessary to fill in a binary 0 in the lowest order, while in the case of a shift to the right, it is necessary to insert a binary 0 in the highest order, also referred to as the −1 digit space. In the case of the dividing disk 362 high order insertion is accomplished by completing a path from the zero generating disk 366, the circuit being made through switch 391. In the case of multiplying disk 363, the 0's are fed from the disk 366 through switch 392 into the low order digit space in the following quadrant. Since 0's are inserted in this manner for each step, the data flow path for disk 363 is diagrammatically set forth only in Step 1. As was mentioned, disk 362 is not required for this example and, therefore, is not included in Figs. 14, 14a and 14b.

It will be recalled that in the previous embodiment, successive shifting of the divisor was accomplished by re-recording it on the multiplying disk 74 in successive steps. In the present circuit, the multiplying disk 363, which is to be used for this purpose, has its output connected to the input bus 367 through the summing circuit 385. In order that the divisor may remain unchanged except for the shift in binal point, means are provided for simultaneously applying to the opposite input lead merely a series of binary 0's. These, when added to the divisor, will not change the magnitude of the latter. The 0's to be used for this purpose are derived from the zero generating disk 366 and are applied to the disk 364 by switches 420, 372. Incidentally, it will be noted that when switch 420 is turned on, low order digit insertion also takes place on the disk 365 through the inverter 409 and the switch 373. This is irrelevant to the problem, however, and need not be given further consideration. The recordations are, however, shown in the flow diagram for the sake of completeness.

*Step 2*

In this step the divisor is read from the storage disk in the memory unit (not shown in Fig. 3) and is recorded for availability on the multiplying disk 363 resulting in a shift of the number one place to the left. Simultaneously, the series of binary 0's to be used in the false process of addition are read off and re-recorded on disk 364, the latter taking place via the switch 401.

*Step 3*

In this step the shifted divisor is added to the series of binary 0's on disk 364 in the summing circuit 385 to produce a divisor which is unaltered except for being shifted one additional place to the left. The series of 0's on disk 364 are also re-recorded on the subsequent quadrant.

Since we are not as yet ready for the dividend it is allowed to remain in the memory unit. It is, however, read off and re-recorded on the subsequent quadrant of the memory unit disk in order that it might be available on the proper quadrant at the beginning of Step 6.

*Step 4*

This step is identical to Step 3, producing an additional shift of the divisor to the left. In this step nothing is done to the dividend.

*Step 5*

This step results in the recording of the shifted divisor or disk 364 in preparation for the division process. This is accomplished by adding the divisor to the series of 0's as before and then by taking the output of the summing circuit and recording it on disk 364 via switches 430, 372. This step also results in the recording of the shifted divisor on disk 363 through switch 371. This is shown on the diagram merely for completeness, since the divisor is recorded on disk 363 but not employed in the subsequent steps.

It is to be noted in all of the Steps 1 to 6 that switch 408 will be closed for all but one digit space in each step. This causes whatever data may be on disk 365 to be recorded back on disk 365 shifted one place during each step. In all of these steps this data is entirely irrelevant and is, therefore, not shown. The actual digits on the disk will depend upon previous problems.

*Step 6*

This is the final preliminary step, the dividend from the memory unit being recorded on disk 363 shifted one place to the left. Simultaneously the divisor is read off of disk 364 and re-recorded thereon.

*Step 7*

This is the start of the actual division steps. In all of these steps, the computer satisfies the requirements set up in the section entitled "Process of Division." By way of review, this includes the subtraction of the divisor from the dividend and the successive addition or subtraction of the divisor from the remainder, the divisor being shifted one place with respect to the remainder in each step. Since the first step is invariably subtraction, switches 399 and 417 are turned on by the control tape causing the inverse of the divisor to be fed into the summing circuit resulting in a negative remainder at the output of the summing circuit. In the previous embodiment, the divisor was next shifted and added to the remainder. In the present circuit, however, the remainder is shifted and the divisor is left unchanged. Such shift is accomplished by recording the remainder on the multiplying disk 363 causing it to be shifted to the left one place.

The last digit out of the summing circuit, as in the previous embodiment, operates flip-flop 431 which in turn selects either switches 398 and 418 or 399 and 417 in the following step. If the left-hand or high order digit of the remainder is 0 indicating a positive remainder, subtraction takes place in the following step, while if the high order digit is a 1 indicating a negative remainder, the summing circuit is directed to perform addition.

Also, as in the previous embodiment, the left-half digit of the remainder is inverted and recorded as a tally, here on disk 365, as the first digit of the uncorrected quotient. This takes place via inverter 409 and switch 373. During Step 7, the divisor is simply read off of disk 364 and re-recorded without shift on the adjacent quadrant.

*Steps 8 to 17*

In Step 8, the switches 398, 418 are preset as a result of the previous step, causing addition of the divisor on disk 364 to take place to produce a positive remainder. The high order digit of the remainder sets the switches 399, 417 in the next step and also is recorded in inverted form as the second digit of the uncorrected quotient. This same process is repeated in Steps 9 through 18. In Steps 11 through 18 the data flow paths are the same as in Step 8 and consequently are shown only in shortened form.

*Step 18*

This step concludes the division process. Switches 398 and 418 or 399 and 417 are selected by the control tape for future steps by turning switch 481 off and switch 480 on. The output of the summing circuit again is recorded on disk 363 because switch 371 is on for all but the last digit. This information is not used, however, since the uncorrected quotient by this time has been completely entered on disk 365.

*Step 19*

Although all of the digits of the quotient have been recorded on disk 365, one additional shift is required to locate them properly and on a single quadrant. This is accomplished merely by reading the quotient from disk 365 and re-recording it thereon. While this shifting is being done, 0's may be supplied to disk 364 just as was done in Step 1. This clears disk 364 for the next problem and makes it unnecessary for a clearing step to be included later. These 0's also flow to disk 363 but are not utilized there.

*Step 20*

The final quotient is read off of disk 365 and passed through switch 407 to the storage disk in the memory unit where it is recorded either for reading by means not shown or for use in a subsequent problem. The uncorrected quotient 011000000000 is precisely the same as that previously obtained and subject to the same correction or placement of binal point previously described.

It will be clear from the foregoing that the operation of the alternate embodiment is somewhat simpler than that of the preferred embodiment, the computation taking place in a total of 20 steps rather than 22 steps. The only drawback in the use of the alternate circuit is that additional discs and additional tubes and other electronic components must be used. From a practical standpoint, however, the difference between the two circuits is not great and either may be successfully employed. Based upon the above teachings, minor mechanical and circuit modifications to either of the circuits described will occur to one skilled in the art.

MATHEMATICAL VERIFICATION OF PROCESS OF DIVISION

While the process of division used herein may be verified by longhand solution of the example chosen for purposes of illustration, it may further be demonstrated that the process results in the correct quotient invariably. Attention is drawn to the fact that any number less than unity may be expressed by a series of negative powers of 2 having coefficients of $+1$ or $-1$. For example, .375 can be expressed as follows:

$$.375 = (+1)2^0 + (-1)2^{-1} + (-1)2^{-2} + (+1)2^{-3}$$

When it is desired to divide one number by another, the divisor is first adjusted relative to the dividend so that the quotient is less than unity. The coefficients for the above series are then obtained by means of a process similar to long division except that the divisor is either added to or subtracted from the remainder, depending upon whether the remainder is negative or positive. Since the series is convergent, it is desired to reduce the remainder to 0, therefore we subtract when the remainder is positive and add when it is negative. When a subtraction is made, we write a +1 as the coefficient for that particular term of the series and when an addition is made, we write a −1 as the coefficient.

As an example of this process, let us divide 3 (0011) by 8 (1000). In order to indicate whether the numbers are positive or negative we will carry an extra place at the left of each number so that the two binary numbers we used are 00011 as the dividend and 01000 as the divisor. The obtaining of coefficients in the manner outlined above may be set forth in long hand as follows:

```
Subtract and write a +1      01000     00011       1, −1, −1, 1
as the coefficient                    −01000

110110
Indicates negative number            + 01000
so divisor will be added and
a −1 written as coefficient          1111100
                                    + 01000

00001000
                                   −    01000

00000000
```

Thus we obtain the coefficients +1, −1, −1, +1 for the four terms of the series, making the answer $$2^0 - 2^{-1} - 2^{-2} + 2^{-3} = 0.375$$

The method just described provides the correct answer as has been shown. The computer, however, is set up to handle only the binary numbers 1 and 0 and cannot write a −1. It has been found, however, that the computer can be caused to go through the above process by writing a 0 in place of a −1. This produces what is termed herein an uncorrected quotient which would obviously be erroneous. It can be demonstrated, however, that a quotient thus expressed in terms of 1's and 0's can be made to equal the true quotient by applying certain corrective expedients. These are— a. Adding an extra term with a coefficient 1 at the end of the series.
b. Doubling the answer obtained in this manner (shift one binary place to the left) and
c. Subtracting 2 (binary 10).

The justification for the above-corrected steps are given in the following paragraphs.

The true quotient, expressed in terms of a series with coefficients of +1 and −1 can be written mathematically as $$Q = \sum_0^n C_j 2^{-j}$$

where $C_j = +1$ or $-1$. Assuming that the computer merely substitutes 0's for −1's in the above expression, the quotient obtained may be expressed mathematically as $$Q' = \sum_0^n C'_j 2^{-j}$$

where $C'_j = +1$ if $C_j = +1$ and $C'_j = 0$ if $C_j = -1$.

Let us assume now that the quotient Q' is multiplied by 2 by means of an additional shift in the computer. The answer obtained by the computer will then be $$2Q' = 2 \sum_0^n C'_j 2^{-j}$$

We can write the following equation $$Q - 2Q' = \sum_0^n (C_j - 2C'_j) 2^{-j}$$

If $C_j = +1$; then $2C'_j = 2$, and $C_j - 2C'_j = -1$. If $C_j = -1$; then $2C'_j = 0$, and $C_j - 2C'_j = -1$. Therefore:

$$Q - 2Q' = -\sum_0^n 2^{-j}$$

$$Q = 2Q' - \sum_0^n 2^{-j}$$

or $$Q = 2Q' - 2 + 2^{-n}$$

Or we may rewrite this expression as $$Q = 2(Q' + 2^{-n-1}) - 2$$

The above expression then says that when 0's are substituted for −1's, the true quotient may be obtained by adding an extra term ($2^{-n-1}$) having a coefficient of 1, doubling the answer obtained in this manner and subtracting 2.

In the following claims the term "addition of electrical impulses" is intended to mean the operation which takes place in the summing circuit herein in which two separate series of electrical impulses are fed sequentially and order by order into a summing circuit to produce a series of electrical impulses which is representative, order by order, of the sum of the incoming data. The term "subtraction of electrical impulses" will be understood to be an analogous operation in which the series of electrical impulses produced is representative, order by order, of the difference between the two numbers represented by the incoming data.

In the following claims, as will be appreciated by one skilled in the art, the term "magnetic disk" refers to a rotatable member presenting a ribbon-like circular path of magnetic material for cooperation with recording and pickup heads.

I claim as my invention:

1. In a digital computer having an arithmetic unit including a plurality of switches for controlling the flow of data, a control unit for said switches comprising: a program storage device having control data spaced at intervals therealong, a series of magnetic disks mounted for rotation in unison with said program storage device, each of said disks having a magnetic discontinuity on the periphery thereof, pickup coils cooperating with said disks for producing respective unlocking pulses synchronized with the feeding of the control data on said program device, a series of locked two-condition devices having their input circuits connected to receive data simultaneously from the program device, said two-condition devices having unlocking leads fed from respective ones of said pickup coils whereby said two-condition devices are momentarily unlocked one by one to assume equilibrium settings respectively corresponding to the data received from the program device at the time of relocking, and means for transmitting said equilibrium settings simultaneously to the switches in the arithmetic unit.

2. In a digital computer having an arithmetic unit including a plurality of switches for controlling the flow of data between rotating magnetic disks during each step in the computation, a control unit for said switches comprising: a driven program device having control data spaced at intervals therealong in the form of spots of magnetism, a series of unlocking disks mounted for rotation in synchronism with said magnetic disks and said program device, each of said disks having a magnetic discontinuity on the periphery thereof, the discontinuities on successive ones of said disks being successively offset from one another, pickup coils cooperating with said disks respectively for producing a succession of unlocking pulses synchronized with the spacing of the control data on said program device, a series of locked two-condition devices connected to receive setting data simultaneously from the program device, said two-condition devices having means for unlocking the same connected to respective ones of said pickup coils whereby said two-condition devices are unlocked one by one to assume settings corresponding to the data received from the program device at the time of unlocking, and means for simultaneously setting the switches in said arithmetic unit in accordance with the settings of respective ones of said two-condition devices.

3. For use in a digital computer including an arithmetic unit having a plurality of switches for directing the flow of data, a control unit for such switches having a driven data storage element having control data spaced at intervals therealong, a series of locked two-condition devices having their input circuits all connected to receive information simultaneously from the data storage element, means including a pair of pulse leads for producing unlocking pulses alternately at intervals corresponding to the spacing of said control data, a series of electronic switches, the input circuits of alternate switches being connected to alternate ones of said pulse leads and the output circuits of said switches being connected to the unlocking leads of respective ones of said locked two-condition devices, and a delay chain composed of a succession of serially connected two-condition devices arranged for operation in succession at intervals corresponding to the spacing of said control data for controlling respective ones of said switches to insure that said locked two-condition devices are unlocked one by one to assume a state of equilibrium corresponding to the data respectively spaced along the storage element.

4. For use in a digital computer including an arithmetic unit having a plurality of switches for directing the flow of data, a control unit comprising a driven data storage element having data spaced at intervals therealong, the combination comprising: a first series of two-condition devices connected as a delay chain, means for unlocking such devices to cause them to operate in sequence at intervals corresponding to the spacing of said control data, a second series of two-condition devices having input leads and output leads and unlocking leads and so arranged as to enable the output to assume a polarity corresponding to that of the input upon application of an unlocking pulse thereto and to remain stably in such condition when the unlocking pulse is removed, said two-condition devices having their input circuits connected to receive information simultaneously from the data storage element and having their unlocking leads connected to receive unlocking pulses from the respective two-condition devices of said delay chain, whereby said second series of two-condition devices are successively placed in states of equilibrium corresponding to the data respectively spaced along the storage element, and means responsive to the condition of said second series of two-condition devices for controlling the setting of switches in the arithmetic unit.

5. In a digital computer including an arithmetic unit having a plurality of switches for directing the flow of data, a control unit therefor comprising a driven data storage element having control data spaced at intervals therealong, the combination comprising a first series of locked two-condition devices connected as a delay chain, means including a pair of pulse leads for producing unlocking pulses alternately at intervals corresponding to the spacing of said control data, said leads being connected to the unlocking terminals of alternate ones of said two-condition devices to cause them to operate in sequence at intervals corresponding to the spacing of said control data, a second series of locked two-condition devices having their input circuits all connected to receive information simultaneously from the data storage element and having their unlocking leads arranged for control by the devices in the delay chain, and auxiliary switches interposed between the pulse leads and the second series of two-condition devices and respectively triggered by the first series of two-condition devices for insuring that two-condition devices in the second series are unlocked singly for setting in sequence by said control data.

6. In a digital computer of the sequential type, an arithmetic unit having a plurality of rotating magnetic disks and a summing circuit together with switches for controlling the flow of data between said disks and said summing circuit; a control unit having means for generating a number pulse indicative of the beginning of each step of computation and for generating switch controlling voltages synchronized with the rotation of said disks for setting said switches in a predetermined combination for each of said steps, said disks including a multiplying disk and a dividing disk for shifting a number to the left and right respectively, said disks each having a recording head thereon and having a pickup head with the recording head spaced from said pickup head by an amount corresponding to the time interval between successive number pulses plus an offset of one digit space, and common means for inserting binary zeros to fill in the digit spaces vacated by shifting of said binary number on the respective disks.

7. In a digital computer of the sequential type, an arithmetic unit having a plurality of rotating magnetic disks and a summing circuit together with switch means for controlling the flow of data between said disks and said summing circuit, a control unit having means for generating switch controlling voltages synchronized with the rotation of said disks for setting said switches in a predetermined combination for each step of computation, at least one of said disks being a multiplying disk employed for multiplication of a binary number by two, said multiplying disk having a recording head thereon and having a pickup head with the recording head so spaced from said pickup head that the number recorded by said recording head and picked up by said pickup head is retarded one digit causing an effective shift of the number one binal place to the left, and means for inserting a binary 0 to fill in the digit space vacated by shifting of said binary number to the left, said binary 0 inserting means being turned on one digit prior to the beginning of a step of computation and turned off precisely at the beginning of a step of computation.

8. In a digital computer of the sequential type, an arithmetic unit having a plurality of rotating magnetic disks and a summing circuit together with switch means for controlling the flow of data between said disks and said summing circuit, a control unit having means for generating switch controlling voltages synchronized with the rotation of said disks for setting said switches in a predetermined combination for each step of computation, at least one of said disks being a dividing disk employed for division of a binary number by two, said dividing disk having a recording head thereon and having a pickup head with the recording head so spaced from said pickup head that the number recorded by said recording head and picked up by said pickup head is advanced one digit causing an effective shift of the number one binal place to the right, and means for inserting a binary 0 to fill in the digit space vacated by shifting of said binary number to the right.

9. In a digital computer in which the digits are acted upon sequentially, means for delaying and advancing a binary number by a time interval corresponding to one digit space between successive steps of computation comprising in sub-combination, rotating disk means having a magnetizable periphery with sufficient number spaces thereon to record a plurality of binary numbers in respective normal positions, each number space being made up of a plurality of digit spaces consisting of a succession of magnetizable spots, means including a pickup head for reading the spots corresponding to a given binary number and for converting them into a succession of electrical pulses indicative of said number, means for amplifying the pulses, and means including a recording head energized by said amplifying means and cooperating with the periphery of said disk means for re-recording the number in a displaced position on said disk means, said recording head being spaced relative to said pickup head to re-record the number in a position shifted from the normal position by one digit space, and means for filling in with a binary 0 the digit space vacated in the normal position by reason of said shift.

10. In a digital computer, means for shifting a binary number one place relative to the binal point comprising, in combination, a rotating disk having a magnetizable periphery with sufficient number spaces thereon to record at least two binary numbers in respective normal positions, each number space being made up of a plurality of digit spaces consisting of magnetizable spots, means including a pickup head for reading said spots and for converting them into corresponding electrical pulses, means for amplifying the pulses, and means including a recording head energized by said amplifying means and cooperating with the periphery of said disk for re-recording the number in a displaced position on the disk, said recording head being spaced from said pickup head to re-record the number shifted from a normal position by one digit space, and means for filling in with a binary 0 the digit space vacated in the normal position by reason of said shift.

11. In a digital computer means for multiplying and dividing a binary number by two comprising, in sub-combination, a multiplying disk, a dividing disk, each of said disks having a succession of number spaces about the periphery thereof including digit spaces for the magnetic digit-by-digit recording of a succession of binary numbers, said disks being coupled for rotation in synchronism, recording and pickup heads cooperating with each of said disks and spaced about the periphery thereof, the recording head being spaced from the pickup head on the multiplying disk by one number space plus one digit space, the recording head being spaced from the pickup head on the dividing disk by one number space minus one digit space, a source of binary digits in the form of electrical pulses synchronized with the rotation of said disks, and switch means for controlling the flow of electrical pulses from said source of binary digits to said disks.

12. In a digital computer means for multiplying and dividing a binary number by two comprising, in sub-combination, a multiplying disk, a dividing disk, each of said disks having a succession of number spaces about the periphery thereof including digit spaces for the magnetic digit-by-digit recording of a succession of binary numbers, said disks being coupled for rotation in synchronism, recording and pickup heads cooperating with each of said disks and spaced about the periphery thereof, the recording head being spaced from the pickup head on the multiplying disk by one number space plus one digit space to effect a shift to the left, the recording head being spaced from the pickup head on the dividing disk by one number space minus one digit space to effect a shift to the right, a source of binary digits in the form of electrical pulses synchronized with the rotation of said disks, switch means for controlling the flow of electrical pulses from said source of binary digits to said disks, a generator for producing a series of binary zeros, means including auxiliary switches for connecting said zero generator to said recording heads to fill in the digit spaces on said disk left vacant by reason of the shift.

13. In a digital computer employing the binary system of numbers the combination comprising a memory unit for the storage of problem data, a control unit for determining the manner in which the data is to be acted upon in each step of computation, an arithmetic unit connected to the control unit for acting upon the data digit by digit, said units each having means including magnetic surfaces advanced by a common drive shaft for the storage of binary numbers and for storage of control data respectively together with switches controlled by the control data for determining the flow of binary numbers to and from the magnetic surfaces in the various steps in the solution of a problem.

14. In a digital computer employing the binary system of numbers, a memory unit having a rotating magnetic record member therein for the storage of problem data; an arithmetic unit having rotating magnetic record members together with recording and pickup heads thereon enabling a binary number to be shifted one place to the right or to the left as it is recorded on and read from said record members; said arithmetic unit further including a summing circuit including means for adding and subtracting a pair of binary numbers simultaneously fed into the input thereof; a plurality of switches in said arithmetic unit for controlling the flow of data; and a control unit having a program control element therein which is drivingly synchronized with the magnetic record members in said arithmetic unit and said memory unit for controlling said switches and enabling the binary data to be added, subtracted, and multiplied and divided by two.

15. In a digital computer employing the binary system of numbers the combination comprising a memory unit for storing data and for making it available as a series of plus-minus and minus-plus voltage couples; an arithmetic unit including means for adding and subtracting binary numbers, means for shifting individual numbers to the right and to the left, and means for temporarily storing the same, said arithmetic unit also including switches for switching a series of voltage couples representative of a binary number between the various portions of the arithmetic unit in successive steps, each step requiring the switches to be set in a particular combination; and a control unit for said switches, said control unit including a source of recorded control data, a first set of two-condition devices having means for setting them one by one into respective conditions predetermined by the control data, a second set of two-condition devices having means for setting them simultaneously into conditions determined by the setting of corresponding two-condition devices in the first set and at the beginning of each step of computation; and means for setting certain of said switches in the arithmetic unit in accordance with the result of a step of computation previously performed to effect the solution of a problem.

16. In a digital computer employing the binary system of numbers the combination comprising a memory unit for storing data and for making it available as a series of plus-minus and minus-plus voltage couples; an arithmetic unit including means for adding and subtracting binary numbers, means for shifting individual numbers to the right and to the left, and means for temporarily storing the same, said arithmetic unit also including switches for switching a series of voltage couples representative of a binary number between the various portions of the arithmetic unit in successive steps, each step requiring the switches to be set in a particular combination; and a control unit for said switches, said control unit including a source of recorded control data, a series of two-condition devices associated with said switches, means for setting said devices simultaneously into conditions directed by the source of control data to at least partially determine what takes place during the ensuing step of computation; and means for setting the switches for addition and subtraction in the arithmetic unit in accordance with the result of a step of computation just previously performed.

17. In a digital computer for division employing the binary system of numbers the combination comprising a memory unit for storing a divisor and a dividend and for making them available as series of plus-minus and minus-plus voltage couples, an arithmetic unit including means for adding and subtracting binary numbers, means for shifting individual numbers to the right and to the left, and means for temporarily storing the same, said arithmetic unit also including switches for switching a series of voltage couples representative of a binary number between the various portions of the arithmetic unit in the successive steps employed in a problem of division, each step requiring the switches to be set in a particular combination; and a control unit for said switches, said control unit including a source of recorded control data, a first set of two-condition devices, a second set of two-condition devices having means for setting them simultaneously into conditions determined by the setting of corresponding two-condition devices in the first set and at the beginning of each step of computation; and means for setting the switches for addition or subtraction in the arithmetic unit in accordance with the result of a step of computation just previously performed.

18. In a binary computer, a source of digits comprising the answer to a problem, said digits being supplied one by one and of successively decreasing order, an answer recording device comprising a rotating storage member, said storage member having a recording head thereon and having a pickup head, said recording head being supplied from said digit source, said pickup head having associated therewith a loop circuit so that data picked up from the storage member may be re-recorded at a different point thereon, said storage member having a plurality of number spaces thereon each consisting of a series of digit spaces, the recording head being so spaced from said pickup head that the number read by said pickup head and simultaneously re-recorded by said recording head is retarded one digit causing an effective shift of the number one digit space for each rotation of the storage member, and means including a switch for supplying individual answer digits to said recording head timed for insertion in the spaces successively vacated by shifting of said binary number to the left so that the answer is built up order by order on said storage member.

19. In a binary computer, a source of digits comprising the answer to a problem, said digits being supplied one by one and of successively decreasing order, an answer recording device comprising a rotating magnetic disk, said disk having a recording head and a pickup head associated therewith, said recording head being supplied from said digit source, a loop circuit interconnecting said heads so that impulses picked up by said pickup head may be simultaneously re-recorded on said disk at another location, said disk having a plurality of number spaces thereon each consisting of a series of digit spaces, the recording head being so spaced from said pickup head that the number recorded by said recording head and picked up by said pickup head is retarded one digit causing an effective shift of the number one digit space during each rotation of the disk, and means including a switch for preventing the re-recording of the high order digit of each number passing through said loop circuit and for recording instead successive ones of said answer digits from said source so that said answer is built up order by order on said disk.

20. In a digital computer including an arithmetic unit for performing computation in successive steps and having a plurality of switches settable at the beginning of each step of computation for controlling the flow of data between storage devices, a control unit for said switches comprising, in combination, a driven program device having control data spaced at regular intervals thereon and having an output; a series of locked two-condition devices each having an input lead, an output lead and an unlocking lead and so arranged that upon applying a voltage pulse to the unlocking lead the device assumes a stable condition dependent upon the then-existing voltage at the input lead, all of said two-condition devices having their input leads connected to receive data from the output of said program device in the form of a series of voltage impulses; means including a plurality of unlocking devices for unlocking respective ones of said two-condition devices; means synchronously coupled to said program device for operating said unlocking devices successively in step with the feeding of control data from the output of said program device, and means for transmitting the settings of the two-condition devices simultaneously to the switches in said arithmetic unit.

21. In a digital computer including an arithmetic unit for performing computation in successive steps and having a plurality of switches settable at the beginning of each step of computation for controlling the flow of data between storage devices, a control unit for said switches comprising, in combination, a driven program device having control data spaced at regular intervals thereon and having an output; a series of locked two-condition devices each having an input lead, an output lead and an unlocking lead and so arranged that upon applying a voltage pulse to the unlocking lead the device assumes a stable condition dependent upon the then-existing voltage at the input lead; said two-condition devices having their input leads connected to receive data simultaneously from the output of said program device in the form of a series of voltage impulses; means synchronously coupled to said program device for applying unlocking pulses to the two-condition devices successively to make them responsive one-by-one to respective bits of control data from said program device during a given step of computation; and means for transmitting the settings of said two-condition devices simultaneously to the switches in said arithmetic unit just prior to the ensuing step of computation.

22. In a digital computer including an arithmetic unit for performing computation in successive steps and having a plurality of switches settable at the beginning of each step of computation for controlling the flow of data between storage devices, a control unit for said switches comprising, in combination, a program device including a storage medium having successive series of control data thereon for setting the switches in successive steps of computation; means for progressively reading the control data comprising a series during a step of computation; a series of locked two-condition devices each having an input lead, an output lead and an unlocking lead and so arranged that upon applying a voltage pulse to the unlocking lead voltage appears at the output lead which coincides with the then-existing voltage at the input lead and which stably persists after the unlocking pulse is removed; said two-condition devices having their input leads connected to said reading means; means synchronously coupled to said reading means for unlocking said two-condition devices one-by-one in step with the reading of the control data; and means for simultaneously transferring the stored control data from the two-condition devices to the switches in the arithmetic unit at the beginning of the ensuing step of computation.

23. In a digital computer including an arithmetic unit for performing computation in successive steps and having a plurality of switches settable at the beginning of each step of computation for controlling the flow of data between storage devices, a control unit for said switches comprising, in combination, a driven program device having control data spaced at regular intervals thereon and having an output; a first series of locked two-condition devices each having an input lead, an output lead and an unlocking lead and so arranged that upon applying a voltage pulse to the unlocking lead the device assumes a stable condition dependent upon the then-existing voltage at the input lead, said two-condition devices having their input leads connected to receive data simultaneously from the output of said program device in the form of a series of voltage impulses; means synchronously coupled to said program device for applying unlocking pulses to the two-condition devices successively to make them responsive one-by-one to respective bits of control data from said program device; a second series of two-condition devices each having an input lead, an output lead and an unlocking lead and so arranged that upon applying a voltage pulse to the unlocking lead the device assumes a stable condition dependent upon the then-existing voltage at the input lead, the input leads of the second series of two-condition devices being coupled to the output leads of the devices in said first series respectively; means for coupling the output leads of said second series of two-condition devices to the switches in the arithmetic unit; and means for simultaneously unlocking all of the devices in the second series at the beginning of an ensuing step of computation.

24. In a binary digital computer for carrying out computation in successive steps, the subcombination comprising means for timing the duration of the steps, a rotating disk having a plurality of number spaces thereon, each of the number spaces being divided into a predetermined number of digit spaces, said disk having a magnetizable periphery for recording binary numbers in said number spaces in the form of spots of magnetism, means including a pickup head for reading said spots and for converting them into a series of voltage impulses, said disk being coupled to said timing means so that successive number spaces are read by said pickup head in precise synchronism with the successive steps of computation, means for amplifying the voltage impulses, means including a recording head energized by said amplifying means and cooperating with the periphery of said disk for recording the voltage impulses successively on the disk in the form of spots of magnetism, said recording head being so spaced from the pickup head that the number is recorded in a separate number space with the digits thereof shifted within said separate number space by an integral number of digit spaces thereby shifting the order of the number, and means coupled to said pickup head for utilizing the shifted number in a successive step of computation.

25. In a binary digital computer for carrying out computation in successive steps, the combination comprising means for timing the duration of the steps, a recording medium having a plurality of number spaces thereon, each of the number spaces being divided into a predetermined number of digit spaces, means including a pickup member for reading said recording medium, means synchronized with the timing means for driving said recording medium relative to the pickup member so that successive number spaces are read by said pickup member in precise synchronism with the successive steps of computation, means including a recording member electrically coupled to the pickup member for re-recording on the recording medium the number read by the pickup member, said recording member being so arranged relative to the pickup member that the number is recorded in a separate number space with the digits thereof shifted within said separate number space by an integral number of digit spaces thereby shifting the order of the number, and means for utilizing the shifted number in a successive step of computation.

26. In a binary digital computer for carrying out computation in successive steps, the subcombination comprising means for timing the duration of the steps, rotating disk means having a plurality of number spaces thereon, each of the number spaces being divided into a predetermined number of digit spaces, said disk means being magnetizable for recording binary numbers in said number spaces in the form of spots of magnetism, means including a pickup head for reading said spots and for converting them into a series of voltage impulses, means coupled to said timing means for rotating said disk means so that successive number spaces are read by said pickup head in precise synchronism with the successive steps of computation, means for amplifying the voltage impulses, means including a recording head energized by said amplifying means and cooperating with the disk means for recording the voltage impulses successively thereon in the form of spots of magnetism, said recording head being so spaced from the pickup head that the number is recorded in a separate number space with the digits thereof shifted one digit space in the direction of rotation thereby effectively dividing the number by decimal 2, and means for utilizing the shifted number in a successive step of computation.

27. In a binary digital computer for carrying out computation in successive steps, the subcombination comprising means for timing the duration of the steps, rotating disk means having a plurality of number spaces thereon, each of the number spaces being divided into a predetermined number of digit spaces, said disk means being magnetizable for recording binary numbers in said number spaces in the form of spots of magnetism, means including a pickup head for reading said spots and for converting them into a series of voltage impulses, means coupled to said timing means for rotating said disk means so that successive number spaces are read by said pickup head in precise synchronism with the successive steps of computation, means for amplifying the voltage impulses, means including a recording head energized by said amplifying means and cooperating with the disk means for recording the voltage impulses successively thereon in the form of spots of magnetism, said recording head being so spaced from the pickup head that the number is recorded in a separate number space with the digits thereof shifted one digit space opposite to the direction of rotation thereby effectively multiplying the number by decimal 2, and means for utilizing the shifted number in a successive step of computation.

28. In a computer of the digital type in which the two binary digits are represented by plus-minus and minus-plus voltage couples, respectively, an arithmetic unit for performing computation in successive steps each characterized by the flowing of binary numbers between storage devices, said arithmetic unit having switches for controlling the flow between said storage devices; means for reading the digit occupying a predetermined digit interval in a flowing binary number which comprises a locked two-condition device having an input lead, an output lead and an unlocking lead and so arranged that upon applying a voltage pulse to the unlocking lead a voltage appears at the output lead having a polarity depending upon the then-existing voltage at the input lead and which stably persists independently of subsequent changes at the input lead, said input lead being connected to said reading means; means for applying an unlocking pulse to said unlocking lead at an instant during said digit interval when the voltage in one-half of the voltage couple is maximum; and means actuated by the output lead of said two-condition device for setting a portion of the switches in the arithmetic unit at the beginning of the ensuing step of computation.

29. In a computer of the digital type in which the two binary digits are represented by plus-minus and minus-plus voltage couples, respectively, an arithmetic unit for performing computation in successive steps each characterized by the flowing of binary numbers between storage devices, said arithmetic unit having switches for controlling the flow between said storage devices; means for reading the digit occupying a predetermined digit interval in a flowing binary number which comprises a first locked two-condition device having an input lead, an output lead and an unlocking lead and so arranged that upon applying a voltage pulse to the unlocking lead a voltage appears at the output lead which coincides with the then-existing voltage at the input lead and which persists independently of subsequent changes at the input lead, said input lead being connected to said reading means; means for applying an unlocking pulse to said unlocking lead at an instant during said digit interval when the voltage in one-half of the couple is maximum; a second locked two-condition device having its input connected to the output of said first two-condition device and having its output coupled to a portion of the switches in said arithmetic unit; and means for applying a voltage pulse to the unlocking lead of said second device at the beginning of an ensuing step of computation.

30. In a computer of the digital type in which two binary digits are represented by plus-minus and minus-plus voltage couples, respectively, an arithmetic unit for performing computation in successive steps each characterized by the flowing of binary numbers between storage devices, said arithmetic unit having switches for controlling the flow between said storage devices, means for storing control data; a series of locked two-condition devices each having an input lead, an output lead and an unlocking lead and so arranged that upon applying a voltage pulse to the unlocking lead a voltage appears at the output lead which depends upon the ten-existing voltage at the input lead and which persists independently of subsequent changes at the input lead; said two-condition devices having their input leads coupled together and arranged to receive a sequential flow of control data from said storage means; means for sequentially applying unlocking pulses to said two-condition devices to make them responsive one-by-one to respective bits of control data from the storage means; means including a locked two-condition device for reading the digit occupying a predetermined digit interval in a flowing binary number; timing means for applying a voltage pulse to said latter two-condition device at an instant during said digit interval when the voltage is maximum, and means for simultaneously coupling the output leads of all of said two-condition devices to respective switches in the arithmetic unit at the beginning of an ensuing step of computation.

31. In a digital computer in which computation takes place in steps of equal duration, the combination comprising a plurality of synchronized storage devices, a summing circuit, means including switches for controlling the flow of binary numbers between the storage devices and between the storage devices and the summing circuit, means for setting the switches at the beginning of each step of computation, fill-in means for insuring that the excess high order digit spaces are occupied by binary zeros in the case of a positive number and binary ones in the case of a negative number, means for reading the digit space of highest order in the binary numbers flowing through a predetermined path in succeeding steps of computation, and means including a storage device for compiling a record of the digits read by the reading means.

32. In a digital computer in which computation takes place in steps of equal duration, the combination comprising a plurality of synchronized storage devices, a summing circuit, means including switches for controlling the flow of binary numbers between the storage devices and between the storage devices and the summing circuit, means for setting the switches at the beginning of each step of computation, fill-in means for insuring that the excess high order digit spaces are occupied by binary zeros in the case of a positive number and binary ones in the case of a negative number, means for reading the digit space of highest order of the binary numbers flowing through a predetermined path in successive steps of computation, means for directing the summing circuit to add or subtract in a succeeding step of computation depending upon whether the read digit is a binary one or a binary zero, and means including a storage device compiling a record of the digits read by the reading means.

33. In a digital computer in which computation takes place in steps, the combination comprising a plurality of synchronized storage devices each having number spaces thereon, each number space being made up of a predetermined number of digit spaces, a summing circuit, means including switches for controlling the flow of binary numbers between the storage devices and between the storage devices and the summing circuit, means for setting the switches at the beginning of each step of computation, fill-in means for insuring that the high order digit spaces are occupied by binary zeros in the case of a positive number and binary ones in the case of a negative number, means for reading the digit space of highest order in the binary numbers successively flowing through a predetermined path in succeeding steps of computation, and means including a storage device synchronized with said plurality of storage devices for compiling a record of the digits read by the reading means.

34. In a digital computer in which computation takes place in steps of equal duration, the combination comprising a plurality of synchronized storage devices, a summing circuit, means including switches for controlling the flow of data between the storage devices and between the storage devices and the summing circuit, means for setting the switches at the beginning of each step of computation, fill-in means for insuring that the excess high order digit spaces are occupied by binary zeroes in the case of a positive number and binary ones in the case of a negative number, means for reading the digit space of the highest order of the binary numbers at the output of the summing circuit in successive steps of computation, and means including a storage device for compiling a record of the digits read by the reading means.

35. In a digital computer in which computation takes place in steps of equal duration, the combination comprising means for supplying problem data in the form of binary numbers each of which consists of a predetermined number of digit spaces with the high order digit spaces completed by binary zeros in the case of a positive number, a plurality of synchronized storage devices, a summing circuit in which a negative number is expressed at the output in the form of the complement, means including switches for controlling the flow of binary numbers between the storage devices and between the storage devices and the summing circuit, means for setting the switches at the beginning of each step of computation, means for reading the digit spaces of highest order in the binary numbers flowing through a predetermined path in successive steps of computation, and means including a storage device for compiling a record of the digits read by the reading means.

36. In a digital computer in which computation takes place in steps of equal duration, the combination comprising a plurality of synchronized storage devices, a summing circuit, means including switches for controlling the flow of data between the storage devices and between the storage devices and the summing circuit, means for setting the switches at the beginning of each step of computation, means associated with one of said storage devices for re-recording a binary number thereon in successive steps of computation and with the number shifted down one order in each successive recording, means including a storage device for recording the output of the summing circuit, means for feeding the shifted binary number and the recorded output of the summing circuit from the previous step into the summing circuit order by order, means for reading the sign of the binary numbers appearing at the output of the summing circuit in successive steps of computation, and means including a storage device for compiling a record of digits representative of the sign read by the reading means.

37. In a digital computer in which computation takes place in steps of equal duration, the combination comprising a plurality of synchronized storage devices having provision for recording binary numbers of equal length with the digit spaces in the higher orders filled in with idle digits, a summing circuit in which a negative number is expressed at the output in the form of the complement, means including switches for controlling the flow of binary numbers between the storage devices and between the storage devices and the summing circuit, means for setting the switches at the beginning of each step of computation, means for reading the digit space of highest order in the binary numbers appearing at the output of the summing circuit in succeeding steps of computation, and means including a storage device for compiling a record of the digits read by the reading means.

38. In a digital computer in which the digits are acted upon sequentially, means for delaying and advancing a number by a definite time interval between successive steps of computation comprising in sub-combination, rotating disk means having a magnetizable periphery divided into a plurality of number spaces sufficient to record a plurality of numbers in respective normal positions, each number space having a plurality of digit spaces consisting of a succession of magnetizable spots, means including a pickup head for reading the spots corresponding to a given number and for converting them into a succession of electrical pulses indicative of said number, means for amplifying the pulses, and means including a recording head energized by said amplifying means and cooperating with the periphery of said disk means for re-recording the number in a displaced position on said disk means, said recording head being spaced relative to said pickup head to re-record the number in a position shifted from the normal position, and means for filling in with 0 the space vacated in the normal position by reason of said shift.

39. In a digital computer employing the binary system of numbers, a memory unit having a rotating magnetic record member therein for the storage of problem data; an arithmetic unit having rotating magnetic record members together with recording and pickup heads thereon enabling a number to be shifted to the right or to the left as it is recorded on and read from said record members; said arithmetic unit further including a summing circuit including means for adding and subtracting a pair of binary numbers simultaneously fed into the input thereof; a plurality of switches in said arithmetic unit for controlling the flow of data; and a control unit having a program control element therein which is synchronized with the magnetic record members in said arithmetic unit and said memory unit for controlling said switches and enabling the binary data to be added and subtracted.

40. In a digital computer for handling binary numbers having a predetermined number of digit spaces including excess high order digits and in which computation takes place in steps of equal duration, the combination comprising a plurality of synchronized temporary storage devices, a summing circuit in which a negative number is expressed at the output in the form of the complement, means including switches for controlling the flow of binary numbers between the storage devices and between the storage devices and the summing circuit, means for setting the switches at the beginning of each step of computation, means associated with at least a portion of the temporary storage devices for binal shifting of the number incident to storage thereof, means for filling in any digit spaces vacated by reason of said binal shifting, means for reading an excess high order digit space in the binary numbers flowing through a predetermined path in succeeding steps of computation, and means including a storage device for compiling a record of the digits read by the reading means.

41. In a digital computer in which computation takes place in steps of equal duration, the combination comprising a plurality of synchronized temporary storage devices having provision for recording binary numbers of equal length with the digit spaces in the higher orders filled with idle digits, a summing circuit so arranged that the idle digit of highest order of each number appearing at its output is representative of the sign of such number, means including switches for controlling the flow of data between the storage devices and between the storage devices and the summing circuit, means for setting the switches at the beginning of each step of computation, means associated with one of said storage devices for re-recording a binary number thereon in successive steps of computation and with the number shifted one order in each successive recording, means including one of said storage devices for recording the output of the summing circuit, means for feeding the shifted binary number and the recorded output of the summing circuit from the previous step into the summing circuit order by order, reading means responsive to the idle digit of highest order in the numbers appearing at the output of the summing circuit in successive steps of computation, and means including a storage device for compiling a record of the digits read by the reading means.

References Cited in the file of this patent

UNITED STATES PATENTS

| | | |
|---|---|---|
| 699,630 | Pedersen | May 6, 1902 |
| 1,177,848 | De Forest | Apr. 4, 1916 |
| 2,279,018 | Wolfe | Apr. 7, 1942 |
| 2,308,778 | Prince | Jan. 19, 1943 |
| 2,369,662 | Deloraine et al. | Feb. 20, 1945 |
| 2,404,047 | Flory et al. | July 16, 1946 |
| 2,475,742 | Hammond | July 12, 1949 |
| 2,540,654 | Cohen et al. | Feb. 6, 1951 |

OTHER REFERENCES

"Theory and Techniques for Design of Electronic Digital Computers," Moore School of Electrical Engineering, Univ. of Pa. 1947; volume IV, pages 47-1 to 47-7, drawing PY-0-219.

"Calculating Instruments and Machines," Douglas R. Hartree, The University of Illinois Press, August 15, 1949, pp. 108-109.

"A Functional Description of the Edvac," volume II, University of Pennsylvania, Moore School of Electrical Engineering, Philadelphia, Pennsylvania, November 1, 1949.